(12) United States Patent
Yamasaki et al.

(10) Patent No.: US 8,628,902 B2
(45) Date of Patent: Jan. 14, 2014

(54) POLYESTER RESIN FOR TONER, TONER, DEVELOPER, TONER CARTRIDGE, PROCESS CARTRIDGE, AND IMAGE FORMING APPARATUS

(75) Inventors: Sumiaki Yamasaki, Kanagawa (JP); Satoshi Hiraoka, Kanagawa (JP); Yuki Sasaki, Kanagawa (JP); Susumu Yoshino, Kanagawa (JP); Hirotaka Matsuoka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 26 days.

(21) Appl. No.: 13/296,494

(22) Filed: Nov. 15, 2011

(65) Prior Publication Data
US 2012/0264041 A1    Oct. 18, 2012

(30) Foreign Application Priority Data
Apr. 15, 2011   (JP) ................. 2011-091570

(51) Int. Cl.
*G03G 9/087* (2006.01)

(52) U.S. Cl.
USPC ............... 430/109.4; 430/123.5; 528/176; 399/252

(58) Field of Classification Search
USPC ............ 430/109.4, 123.5; 528/176; 399/252
See application file for complete search history.

(56) References Cited

U.S. PATENT DOCUMENTS

| | | | |
|---|---|---|---|
| 4,981,939 A | 1/1991 | Matsumura et al. | |
| 2003/0162115 A1 | 8/2003 | Uchinokura et al. | |
| 2003/0203301 A1 | 10/2003 | Iga | |
| 2006/0216627 A1 | 9/2006 | Mizutani et al. | |
| 2007/0015077 A1 | 1/2007 | Yamashita et al. | |
| 2007/0218389 A1 | 9/2007 | Honda et al. | |

(Continued)

FOREIGN PATENT DOCUMENTS

| | | |
|---|---|---|
| JP | A-60-186866 | 9/1985 |
| JP | A-63-127253 | 5/1988 |

(Continued)

OTHER PUBLICATIONS

Translation of JP 2006-292820 published Oct. 2006.*

(Continued)

*Primary Examiner* — Peter Vajda
(74) *Attorney, Agent, or Firm* — Oliff & Berridge, PLC

(57) ABSTRACT

A polyester resin for a toner containing: a repeating unit derived from a dicarboxylic acid component; and a repeating unit derived from a diol component represented by Formula (1):

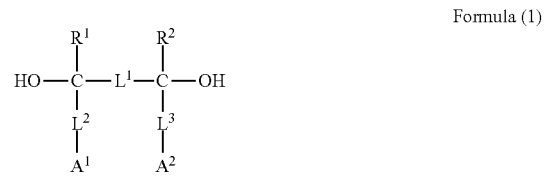

Formula (1)

wherein each of $R^1$ and $R^2$ independently represents a hydrogen atom or a methyl group, each of $L^1$, $L^2$ and $L^3$ independently represents a divalent linking group selected from the group consisting of carbonyl groups, ester groups, ether groups, sulfonyl groups, substituted or unsubstituted chained alkylene groups, substituted or unsubstituted cyclic alkylene groups, substituted or unsubstituted arylene groups, and combinations thereof, $L^1$ and $L^2$ or $L^1$ and $L^3$ optionally forms a ring, and each of $A^1$ and $A^2$ independently represents a rosin ester group.

16 Claims, 3 Drawing Sheets

(56) References Cited

U.S. PATENT DOCUMENTS

| | | | |
|---|---|---|---|
| 2008/0131802 A1 | 6/2008 | Mizutani et al. | |
| 2009/0156784 A1* | 6/2009 | Kubo et al. | 530/211 |
| 2010/0183964 A1 | 7/2010 | Yoshida et al. | |
| 2010/0196817 A1 | 8/2010 | Sasaki et al. | |
| 2010/0209835 A1 | 8/2010 | Takahashi et al. | |
| 2010/0291481 A1 | 11/2010 | Yamada et al. | |
| 2012/0183896 A1 | 7/2012 | Sacripante et al. | |
| 2012/0264041 A1 | 10/2012 | Yamasaki et al. | |
| 2013/0071785 A1 | 3/2013 | Moroiwa et al. | |

FOREIGN PATENT DOCUMENTS

| | | | |
|---|---|---|---|
| JP | B2-02-45188 | 10/1990 | |
| JP | A-2004-163836 | 6/2004 | |
| JP | A-2005-309178 | 11/2005 | |
| JP | 2006-292820 | * 10/2006 | G03G 9/087 |
| JP | A-2006-285195 | 10/2006 | |
| JP | A-2006-292820 | 10/2006 | |
| JP | A-2007-137910 | 6/2007 | |
| JP | A-2007-322932 | 12/2007 | |
| JP | A-2008-139647 | 6/2008 | |
| JP | A-2008-185681 | 8/2008 | |
| JP | A-2008-281882 | 11/2008 | |
| JP | A-2008-281884 | 11/2008 | |
| JP | A-2010-20170 | 1/2010 | |
| JP | A-2010-117575 | 5/2010 | |
| JP | B2-4505738 | 7/2010 | |
| JP | A-2011-2802 | 1/2011 | |
| JP | B1-4699558 | 3/2011 | |
| JP | A-2012-149254 | 8/2012 | |
| JP | A-2012-172027 | 9/2012 | |
| JP | A-2012-229413 | 11/2012 | |
| JP | A-2012-229419 | 11/2012 | |
| JP | A-2012-229420 | 11/2012 | |
| JP | A-2012-230374 | 11/2012 | |
| JP | A-2012-230375 | 11/2012 | |
| JP | A-2012-230376 | 11/2012 | |

OTHER PUBLICATIONS

Extended European Search Report issued in European Application No. 11 19 0248.2 dated Jul. 2, 2012.
U.S. Appl. No. 13/626,433 in the name of Shiozaki et al., filed Sep. 25, 2012.
U.S. Appl. No. 13/626,611 in the name of Miyata et al., filed Sep. 25, 2012.
U.S. Appl. No. 13/626,548 in the name of Yamasaki et al., filed Sep. 25, 2012.
U.S. Appl. No. 13/626,581 in the name of Chonan et al., filed Sep. 25, 2012.
U.S. Appl. No. 13/626,502 in the name of Sasaki et al., filed Sep. 25, 2012.
U.S. Appl. No. 13/626,645 in the name of Matsuoka et al., filed Sep. 25, 2012.
Apr. 9, 2013 Japanese Office Action issued in Japanese Patent Application No. 2012-092446 (with translation).
Jun. 24, 2013 Office Action issued in U.S. Appl. No. 13/626,548.
Jun. 21, 2013 Office Action issued in U.S. Appl. No. 13/626,581.
Oct. 24, 2013 Office Action issued in U.S. Appl. No. 13/626,611.
Oct. 24, 2013 Office Action issued in U.S. Appl. No. 13/626,645.

* cited by examiner ent embodiment; and

POLYESTER RESIN FOR TONER, TONER, DEVELOPER, TONER CARTRIDGE, PROCESS CARTRIDGE, AND IMAGE FORMING APPARATUS

CROSS-REFERENCE TO RELATED APPLICATION(S)

The present application claims priority from Japanese Patent Application No. 2011-091570 filed on Apr. 15, 2011, the entire content of which is incorporated herein by reference.

BACKGROUND

1. Field

The present invention relates to a polyester resin for a toner, a toner, a developer, a toner cartridge, a process cartridge, and an image forming apparatus.

2. Description of the Related Art

Similar to electrophotography, a method for visualizing image information by forming and developing an electrostatic latent image has been currently used in various fields. According to the method, an image is formed by electrically charging the entire surface of a photoconductor (or a latent image holding member), exposing the surface of the photoconductor to laser light according to image information to form an electrostatic latent image, developing the electrostatic latent image with a developer including a toner to form a toner image, and transferring and fixing the toner image to the surface of a recording medium.

SUMMARY (1) A polyester resin for a toner including: a repeating unit derived from a dicarboxylic acid component; and a repeating unit derived from a diol component represented by Formula (1):

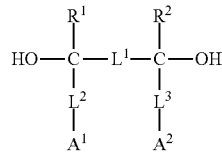

Formula (1)

wherein each of $R^1$ and $R^2$ independently represents a hydrogen atom or a methyl group, each of $L^1$, $L^2$ and $L^3$ independently represents a divalent linking group selected from the group consisting of carbonyl groups, ester groups, ether groups, sulfonyl groups, substituted or unsubstituted chained alkylene groups, substituted or unsubstituted cyclic alkylene groups, substituted or unsubstituted arylene groups, and combinations thereof, $L^1$ and $L^2$ or $L^1$ and $L^3$ optionally forms a ring, and each of $A^1$ and $A^2$ independently represents a rosin ester group.

BRIEF DESCRIPTION OF DRAWINGS

Exemplary embodiments of the present invention will be described in detail based on the following figures, wherein.

DETAILED DESCRIPTION OF EXEMPLARY EMBODIMENTS

Figure 1:
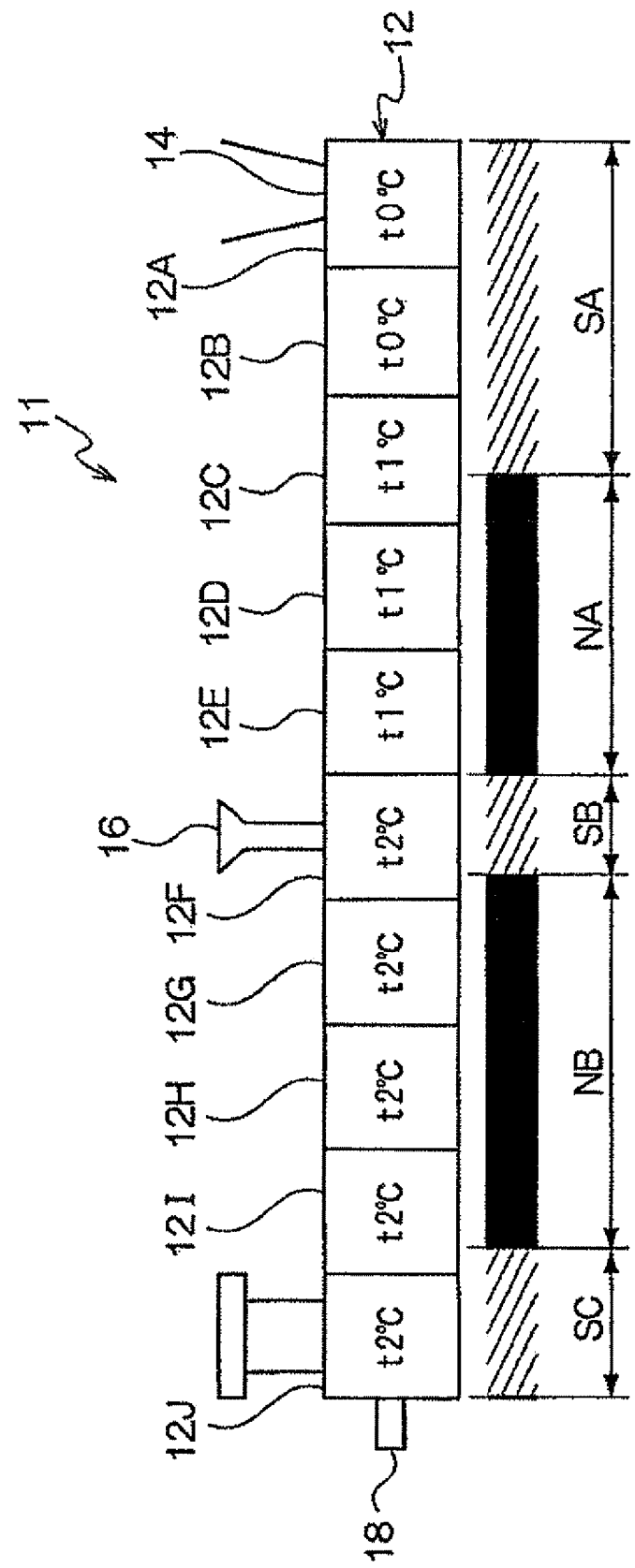
FIG. 1 is a diagram for explaining the state of a screw in an example of a screw extruder for use in the production of a toner according to the present exemplary embodiment.

Exemplary embodiments of the polyester resin for a toner, the toner, the developer, the toner cartridge, the process cartridge and the image forming apparatus of the invention will now be described in detail.

<Polyester Resin for Toner>

The polyester resin (hereinafter, also referred to as 'specific polyester resin') for a toner according to the present exemplary embodiment contains a repeating unit derived from a dicarboxylic acid component and a repeating unit derived from a diol component represented by Formula (1):

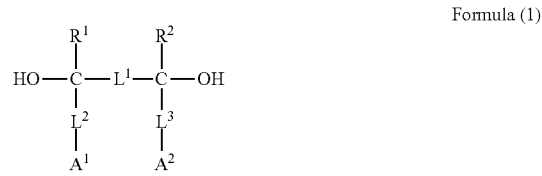

Formula (1)

wherein each of $R^1$ and $R^2$ independently represents a hydrogen atom or a methyl group, each of $L^1$, $L^2$ and $L^3$ independently represents a divalent linking group selected from the group consisting of carbonyl groups, ester groups, ether groups, sulfonyl groups, chained alkylene groups which may be substituted or unsubstituted, cyclic alkylene groups which may be substituted or unsubstituted, arylene groups which may be substituted or unsubstituted, and combinations thereof, $L^1$ and $L^2$ or $L^1$ and $L^3$ may form a ring, and each of $A^1$ and $A^2$ independently represents a rosin ester group.

The diol component represented by Formula (1) is a compound that contains two rosin ester groups in one molecule (hereinafter, also referred to as 'specific rosin diol'). In Formula (1), each of $R^1$ and $R^2$ independently represents a hydrogen atom or a methyl group. Each of $A^1$ and $A^2$ independently represents a rosin ester group. In the present exemplary embodiment, the rosin ester group refers to a moiety in which a hydrogen atom is excluded from a carboxyl group included in a rosin.

In contrast, the resin composition for an electrophotographic toner described in Japanese Patent No. 4505738 contains a reaction product (P) of a rosin (R) and an epoxy group-containing compound (E), and a binder resin (O), but the reaction product (P) includes hydroxyl groups in the molecule as a result of the reaction of carboxylic acids derived from the rosin (R) and epoxy groups derived from the epoxy group-containing compound (E). The amount of the reaction product (P) in the resin composition for an electrophotographic toner is limited because there is a concern that the presence of a large amount of the hydroxyl groups in the resin composition for an electrophotographic toner may adversely affect the electrostatic properties of a toner. This may make it difficult for a sufficient amount of rosin ester groups to be present in the resin composition for an electrophotographic toner. Accordingly, despite the use of the resin composition for an electrophotographic toner described in Japanese Patent No, 4505738, benefits from the presence of the rosin moieties may not be expected.

The polyester for a toner described in Japanese Patent Application Laid-Open No. 2007-137910 is prepared by polycondensation of an alcoholic component with a carboxylic acid component containing a purified rosin. However, the carboxylic acid included in the rosin is weakly reactive due to its tertiary structure. This weak reactivity renders esterification between the alcoholic component and the resin difficult to occur, tending to leave unreacted rosin in the resin. As a result, the polyester for a toner is likely to absorb moisture. This tendency may lead to deterioration in the electrostatic properties of a toner including the polyester.

Meanwhile, the toner including the specific polyester according to the present exemplary embodiment has excellent electrostatic properties. The reason for this is unclear but is inferred as follows.

The specific polyester of the present exemplary embodiment contains a repeating unit derived from the specific rosin diol. A rosin, which is a base of the rosin ester groups contained in the specific rosin diol, possesses a bulky structure and is highly hydrophobic, making it difficult for the specific polyester including the rosin ester groups according to the present exemplary embodiment to contain water. Furthermore, since the polyester resin has hydroxyl or carboxyl groups only at a terminal of the polyester resin in view of its structure, the amount of the rosin ester groups in the resin can be increased without the need to increase the amount of hydroxyl groups or carboxyl groups, which may adversely affect the electrostatic properties of the toner. In the case where the specific rosin diol is obtained by the reaction of a rosin and a difunctional epoxy compound, the ring-opening reaction of the epoxy groups present in the difunctional epoxy compound with the carboxyl group present in the rosin is more reactive than the esterification between the alcoholic component and the rosin. In this case, the rosin hardly remains unreacted in the specific polyester of the present exemplary embodiment. For this reason, it is inferred that the toner including the specific polyester of the present exemplary embodiment has excellent electrostatic properties.

The following is an example of a synthetic scheme of the specific polyester according to the present exemplary embodiment. As depicted in the synthetic scheme, a difunctional epoxy compound is reacted with a rosin to synthesize the specific rosin diol, which is then subjected to polycondensation with a dicarboxylic acid component to synthesize the specific polyester of the present exemplary embodiment. The portion surrounded by the dashed line in the structural formula representing the specific polyester corresponds to the rosin ester group of the present exemplary embodiment.

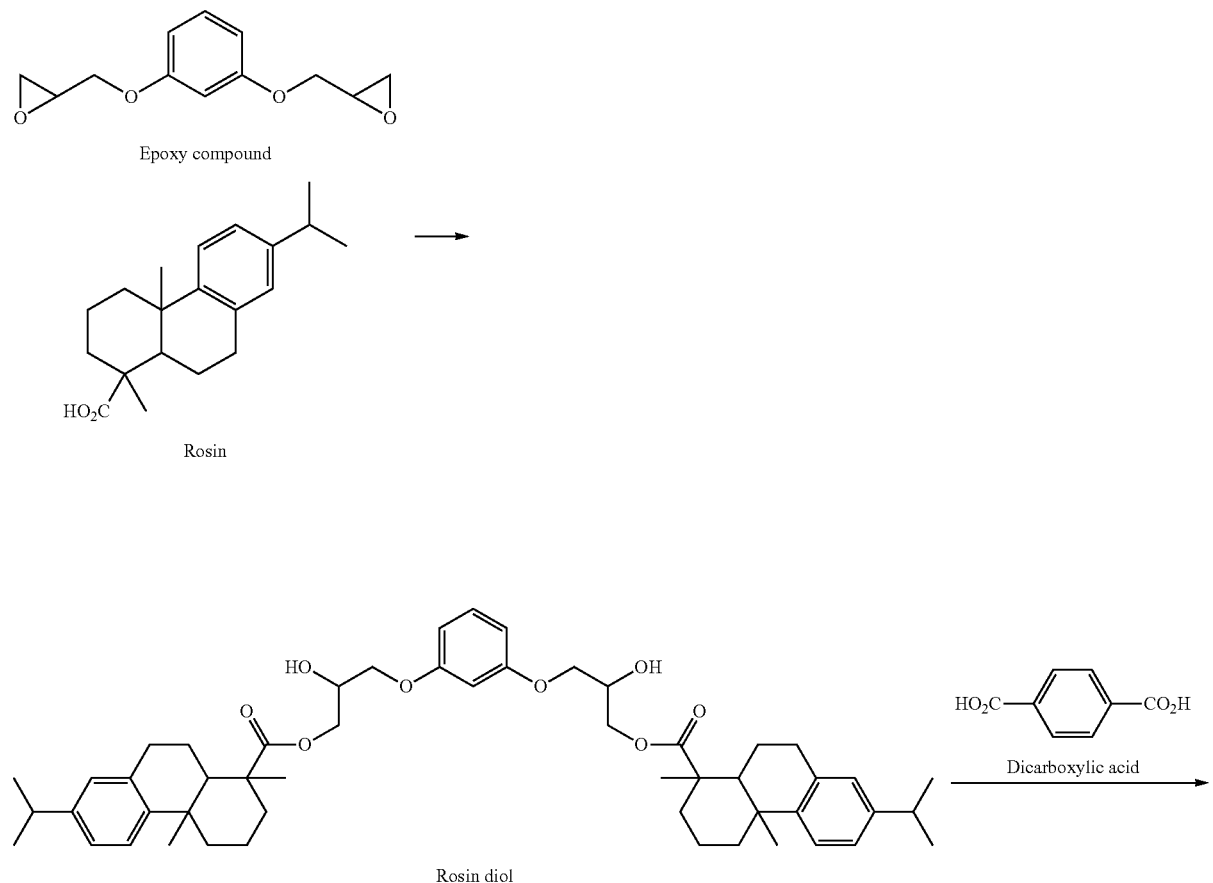

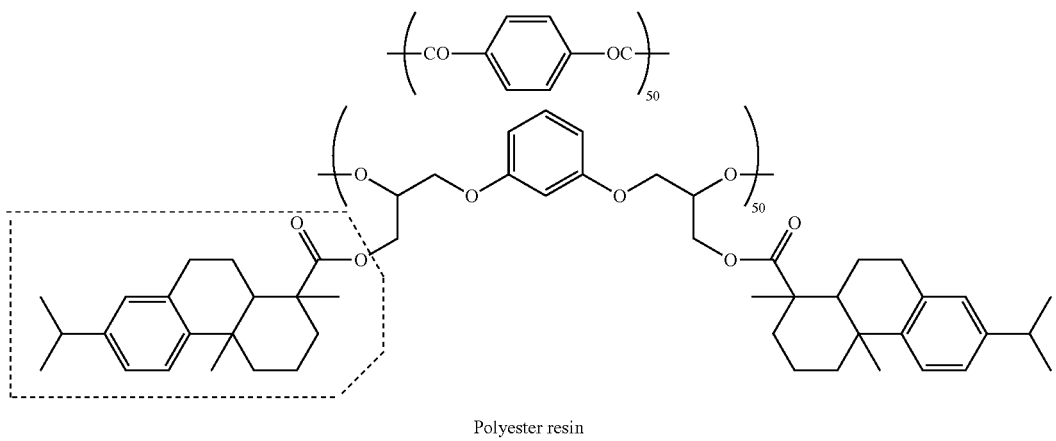
Polyester resin
Hydrolysis of the specific polyester gives the following monomers. Since the polyester is a condensation product of a dicarboxylic acid and a diol in a ratio of 1:1, the constituent components of the resin can be estimated from the hydrosates.
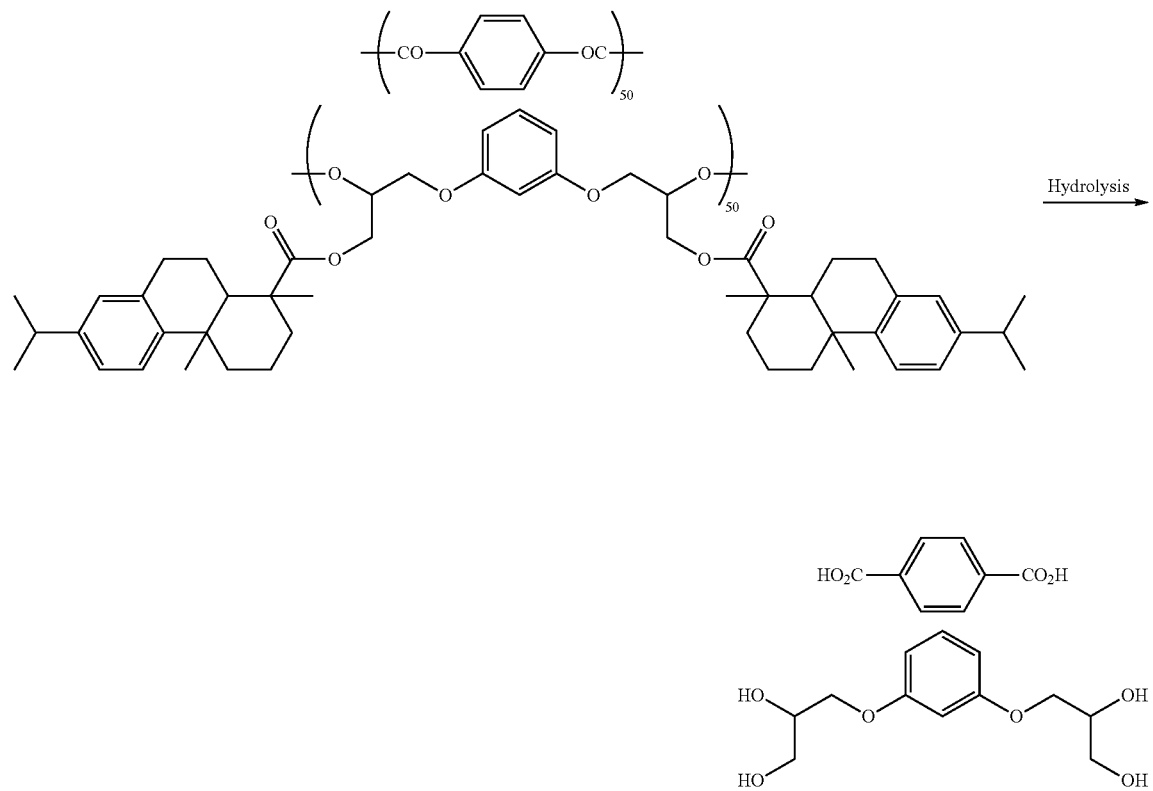

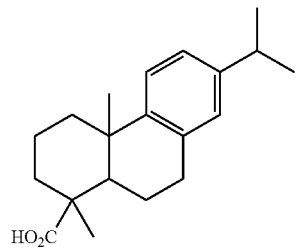

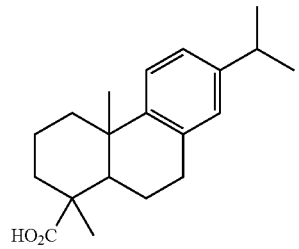

In Formula (1), each of $L^1$, $L^2$ and $L^3$ independently represents a divalent linking group selected from the group consisting of carbonyl groups, ester groups, ether groups, sulfonyl groups, chained alkylene groups which may be substituted or unsubstituted, cyclic alkylene groups which may be substituted or unsubstituted, arylene groups which may be substituted or unsubstituted, and combinations thereof, and $L^1$ and $L^2$ or $L^1$ and $L^3$ may form a ring.

The chained alkylene groups represented by $L^1$, $L^2$ and $L^3$ may be, for example, $C_1$-$C_{10}$ alkylene groups.

The cyclic alkylene groups represented by $L^1$, $L^2$ and $L^3$ may be, for example, $C_3$-$C_7$ cyclic alkylene groups.

The arylene groups represented by $L^1$, $L^2$ and $L^3$ may be, for example, phenylene, naphthylene and anthracene groups.

Examples of substituents of the chained alkylene groups, the cyclic alkylene groups and the arylene groups include $C_1$-$C_8$ alkyl groups and aryl groups. A linear, branched or cyclic alkyl group is preferred. Specific examples of such alkyl groups include methyl, ethyl, propyl, butyl, pentyl, hexyl, heptyl, octyl, isopropyl, isobutyl, s-butyl, t-butyl, isopentyl, neopentyl, 1-methylbutyl, isohexyl, 2-ethylhexyl, 2-methylhexyl, cyclopentyl, cyclohexyl and phenyl groups.

The specific rosin diol represented by Formula (1) can be synthesized by methods known in the art, for example, by the reaction of a difunctional epoxy compound and a rosin. The difunctional epoxy compound that may be used in the present exemplary embodiment is an epoxy group-containing compound including two epoxy groups in one molecule. Examples of such difunctional epoxy compounds include diglycidyl ethers of aromatic diols, diglycidyl ethers of aromatic dicarboxylic acids, diglycidyl ethers of aliphatic diols, diglycidyl ethers of alicyclic diols, and alicyclic epoxides.

Representative examples of the diglycidyl ethers of aromatic dials include diglycidyl ethers of bisphenol A, derivatives of bisphenol A, such as polyalkylene oxide adducts of bisphenol A, bisphenol F, derivatives of bisphenol F, such as polyalkylene oxide adducts of bisphenol F, bisphenol S, derivatives of bisphenol S, such as polyalkylene oxide adducts of bisphenol S, resorcinol, t-butylcatechol and biphenols as aromatic diol components.

Representative examples of the diglycidyl ethers of aromatic dicarboxylic acids include diglycidyl ethers of terephthalic acid, isophthalic acid and phthalic acid as aromatic dicarboxylic acid components.

Representative examples of the diglycidyl ethers of aliphatic dials include diglycidyl ethers of ethylene glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, and polytetramethylene glycol as aliphatic diol components.

Representative examples of the diglycidyl ethers of alicyclic diols include hydrogenated bisphenol A, derivatives of hydrogenated bisphenol A, such as polyalkylene oxide adducts of hydrogenated bisphenol A, and cyclohexanedimethanol as alicyclic diol components.

Representative examples of the alicyclic epoxides include limonene dioxide.

The epoxy group-containing compound may be obtained, for example, by the reaction of a diol component and an epihalohydrin. A higher molecular weight of the epoxy group-containing compound can be accomplished by polycondensation depending on the ratio of the dial component to the epihalohydrin.

In the present exemplary embodiment, the reaction between the rosin and the difunctional epoxy compound is mainly carried out by the ring-opening reaction of the epoxy groups of the difunctional epoxy compound with the carboxyl group of the rosin. The reaction is preferably carried out at a temperature equal to or higher than the melting temperatures of both the reactants and/or a temperature where both the reactants can be homogenized. Specifically, the reaction temperature is typically from 60° C. to 200° C. A catalyst may be added to promote the ring-opening reaction of the epoxy groups.

Examples of catalysts suitable for use in the reaction include: amines, such as ethylenediamine, trimethylamine and 2-methylimidazole; quaternary ammonium salts, such as triethylammonium bromide, triethylammonium chloride and butyltrimethylammonium chloride, and triphenylphosphine.

The reaction can be carried out by various methods. Generally, the reaction may be carried out in a batch manner. In this case, the rosin and the difunctional epoxy compound are added in a predetermined ratio to a heatable flask equipped with a condenser, a stirrer, an inert gas introducing hole and a thermometer, the mixture is heat-melted, and the reaction mixture is appropriately sampled to trace the reaction. The progress of the reaction can be mainly confirmed by a reduction in acidity. The reaction can be appropriately finished at or near the stoichiometric endpoint.

There is no particular restriction on the ratio of the rosin to the difunctional epoxy compound. It is preferred to react the rosin and the difunctional epoxy compound in a molar ratio of 1.5-2.5:1.

The rosin used in the present exemplary embodiment is a generic name for resin acids obtained from trees and is a naturally occurring substance that includes abietic acid, a kind of tricyclic diterpenes, and isomers thereof as major components. In addition to abietic acid, specific rosin components are palustric acid, neoabietic acid, pimaric acid, dehydroabietic acid, isopimaric acid, sandaracopimaric acid. The rosin used in the present exemplary embodiment is a mixture of these acids.

Rosins are largely divided into three kinds: tall rosins obtained from pulps as raw materials, gum rosins obtained from pine trees as raw materials, and wood rosins obtained from the roots of pine trees as raw materials, by collection methods of raw materials. The rosin used in the present exemplary embodiment is preferably a gum rosin and/or a tall rosin for their ease of purchase.

It is preferred to purify these rosins before use. A purified rosin can be obtained by removing high molecular weight substances thought to be derived from peroxides of resin acids and non-saponified substances included in unpurified rosins. Any purification methods known in the art can be used without particular limitation to purify rosins, and specific examples thereof include distillation recrystallization and extraction. Purification by distillation is preferred from an industrial viewpoint. A distillation method is usually selected taking into consideration the distillation time at a temperature of 200° C. to 300° C. and a pressure of 6.67 kPa or below. Recrystallization is performed, for example, by dissolving an unpurified rosin in a good solvent, partially removing the solvent to obtain a concentrated solution, and adding a poor solvent to the solution. Examples of such good solvents include: aromatic hydrocarbons, such as benzene, toluene and xylene; chlorinated hydrocarbons, such as chloroform; alcohols, such as lower alcohols; ketones, such as acetone; and acetates, such as ethyl acetate. Examples of such poor solvents include hydrocarbon-based solvents, such as n-hexane, n-heptane, cyclohexane and isooctane. According to an extraction method, an unpurified rosin is dissolved in alkaline water to prepare an alkaline aqueous solution, the alkaline aqueous solution is extracted with an organic solvent to remove non-saponified insoluble substances, and the aqueous layer is neutralized to obtain a purified rosin.

The rosin used in the present exemplary embodiment may be a disproportionated rosin. The disproportionated rosin is obtained by heating a rosin including abietic acid as a major component in the presence of a disproportionation catalyst to eliminate unstable conjugated double bonds in the molecule. The disproportionated rosin is a mixture of dehydroabietic acid and dihydroabietic acid as major components.

The disproportionation catalyst may be any of those known in the art, for example: supported catalysts, such as palladium carbon, rhodium carbon and platinum carbon; metal powders, such as nickel and platinum powders; iodine; and iodides, such as iron iodide.

The rosin used in the present exemplary embodiment may be a hydrogenated rosin obtained by eliminating unstable conjugated double bonds in the molecule. The hydrogenation can be performed under suitable conditions selected from hydrogenation conditions known in the art. Specifically, the hydrogenation is performed by heating a rosin under a hydrogen pressure in the presence of a hydrogenation catalyst. The hydrogenation catalyst may be any of those known in the art, for example: supported catalysts, such as palladium carbon, rhodium carbon and platinum carbon; metal powders, such as nickel and platinum powders; iodine; and iodides, such as iron iodide.

The disproportionated rosin and the hydrogenated rosin may be purified in the same manner as described above before or after disproportionation and hydrogenation, respectively.

The following are exemplary compounds of specific rosin diols suitable for use in the present exemplary embodiment are shown below, but the present exemplary embodiment is not limited thereto.

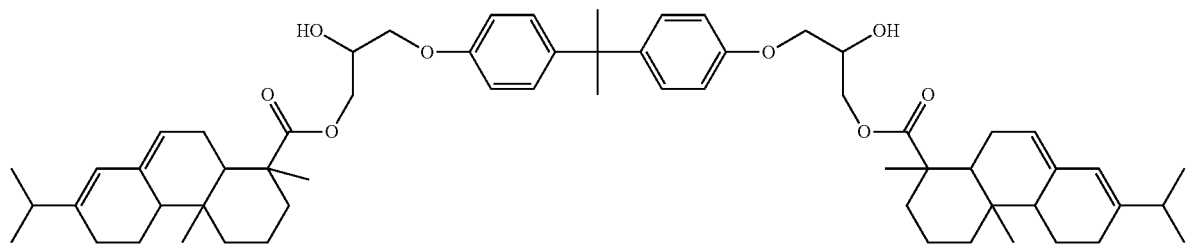

(1)

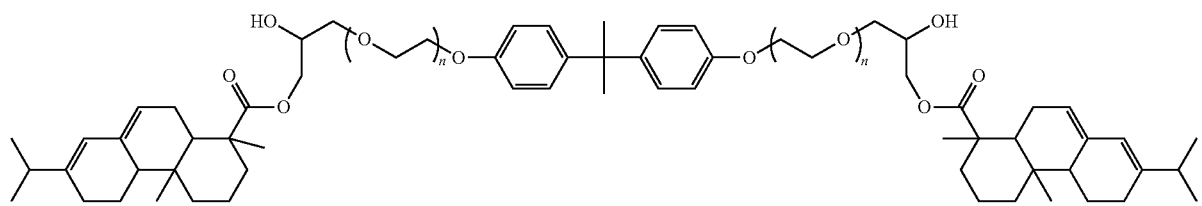

(2)

-continued
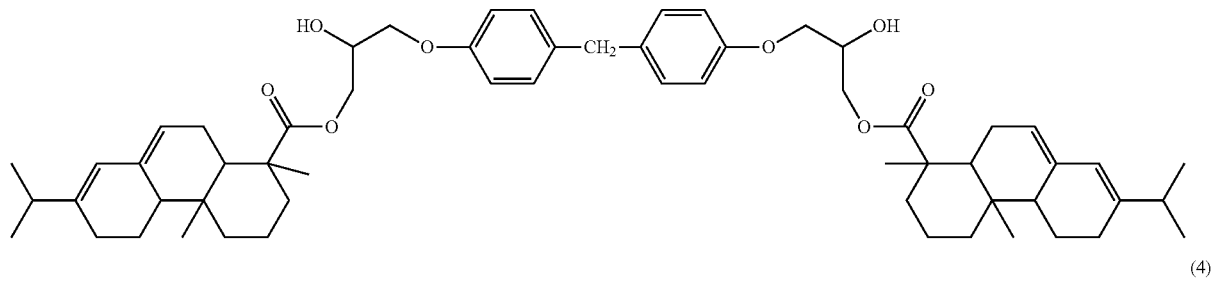
(3)
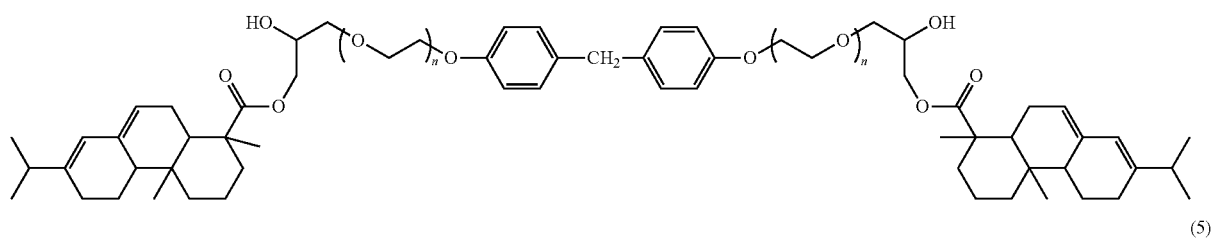
(4)
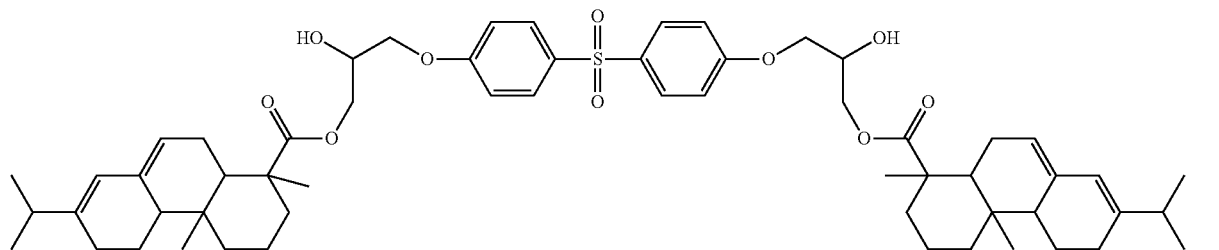
(5)
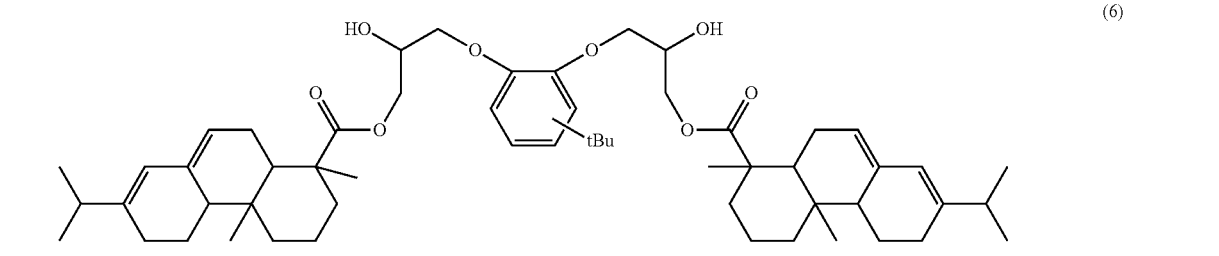
(6)
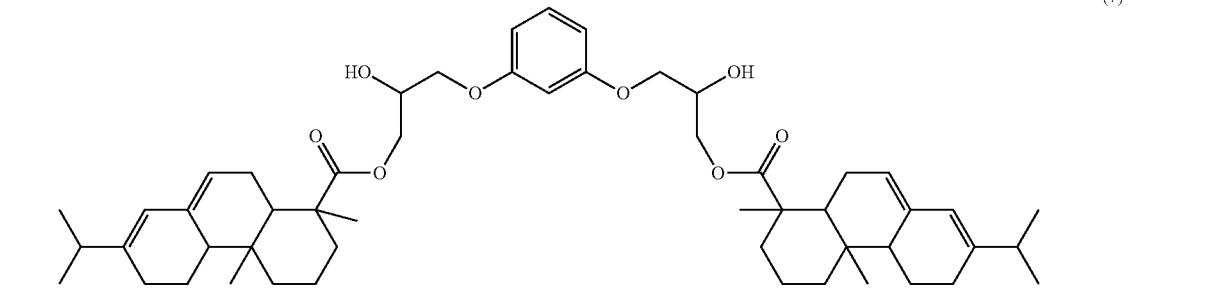
(7)
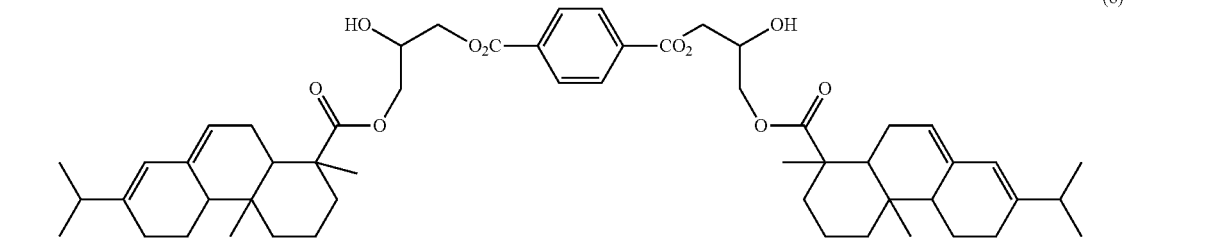
(8)

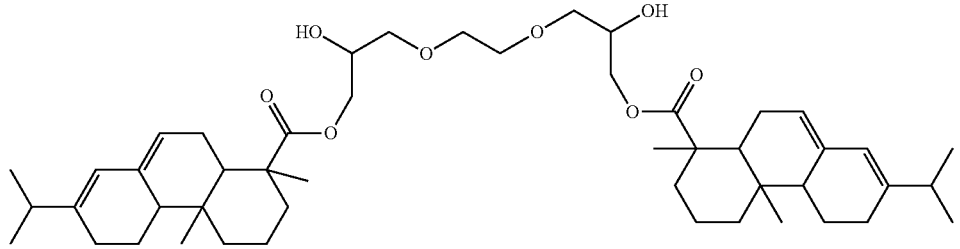
(9)
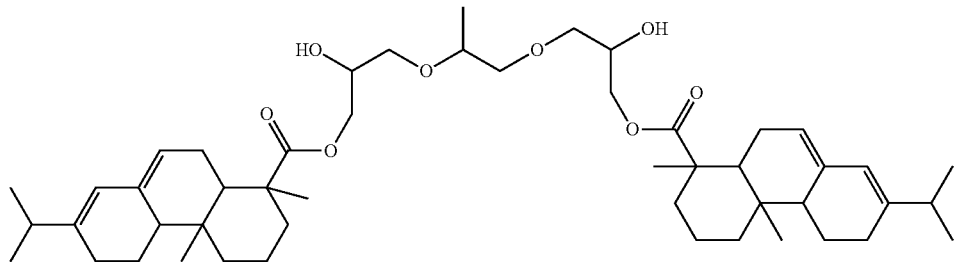
(10)
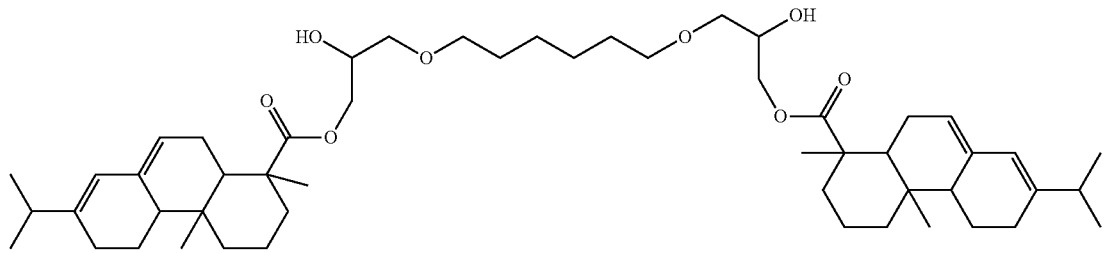
(12)
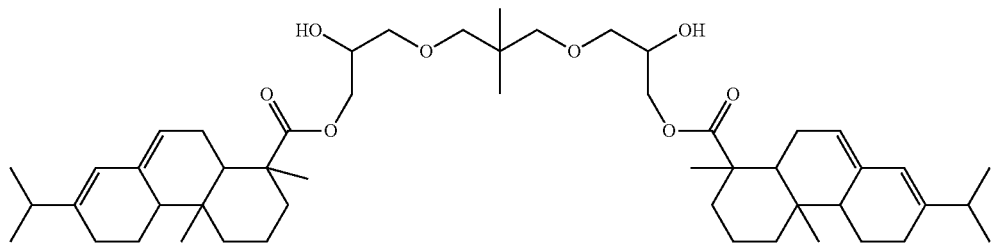
(13)
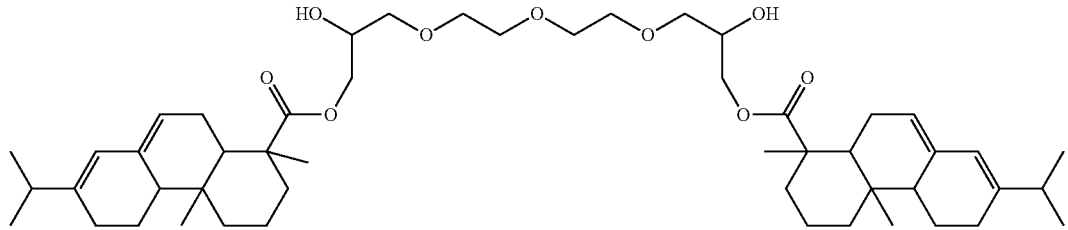
(14)
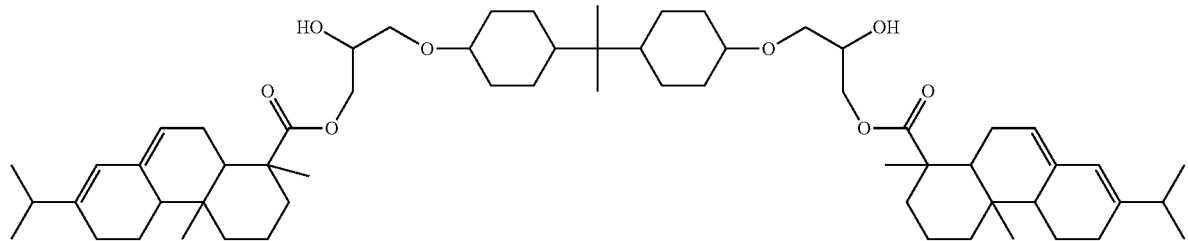
(15)

(16)
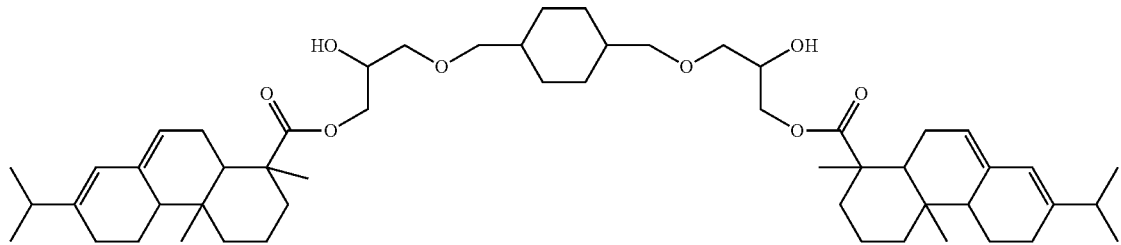
(17)
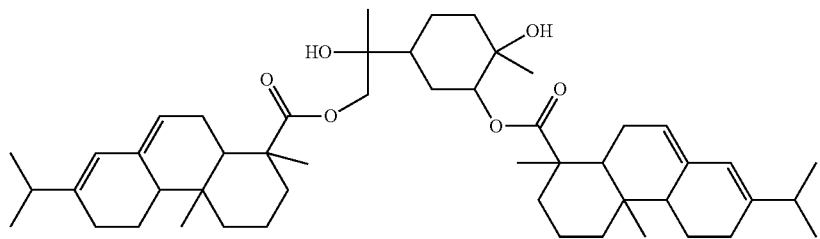
(18)
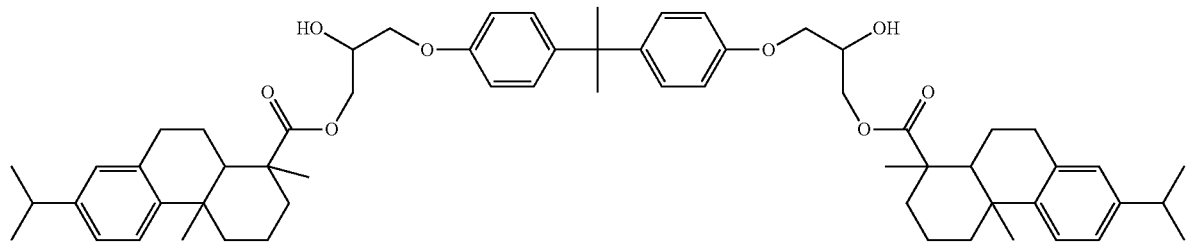
(19)
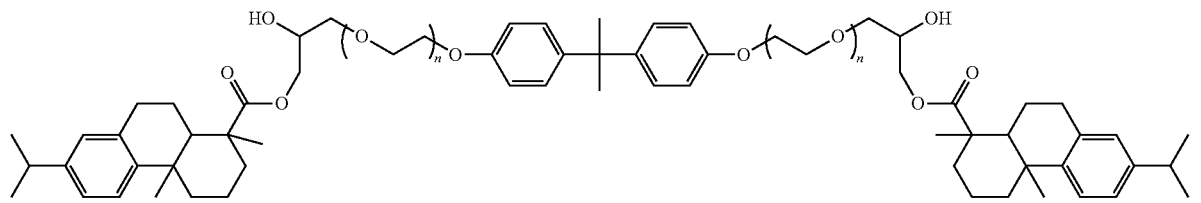
(20)
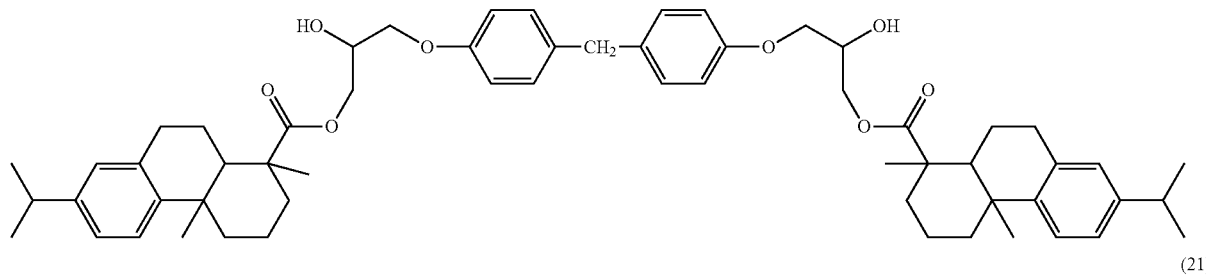
(21)
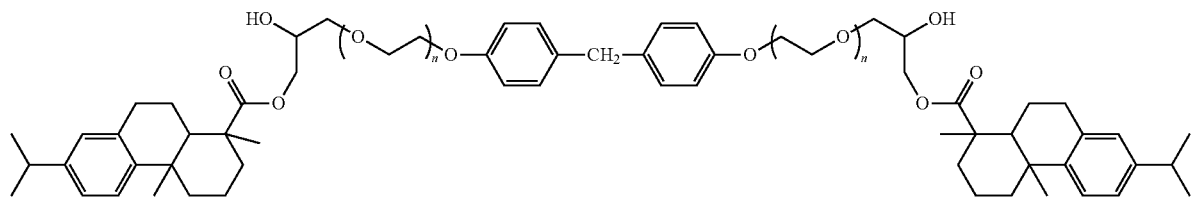

(22)
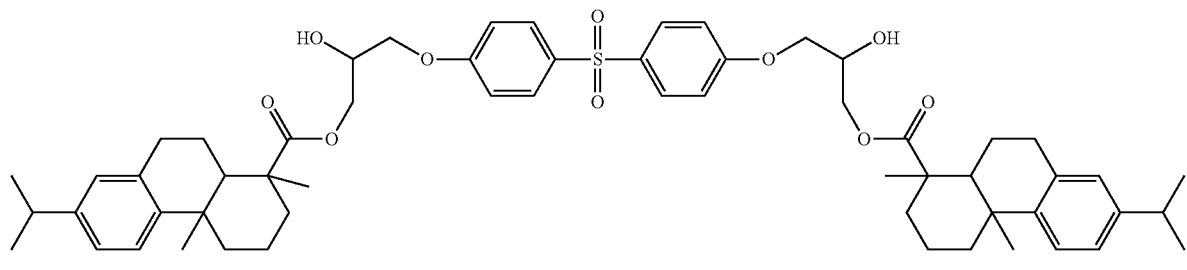
(23)
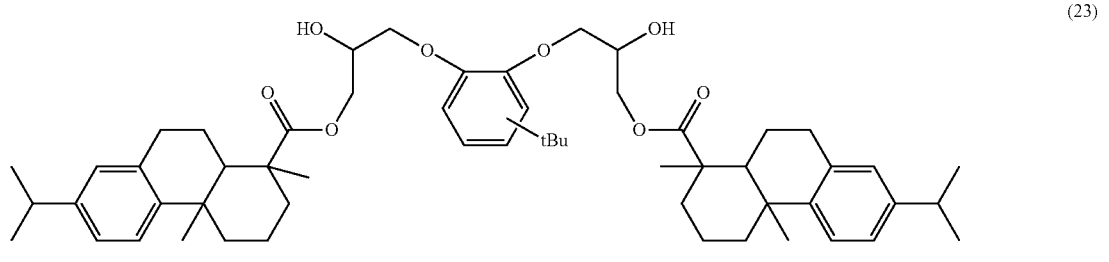
(24)
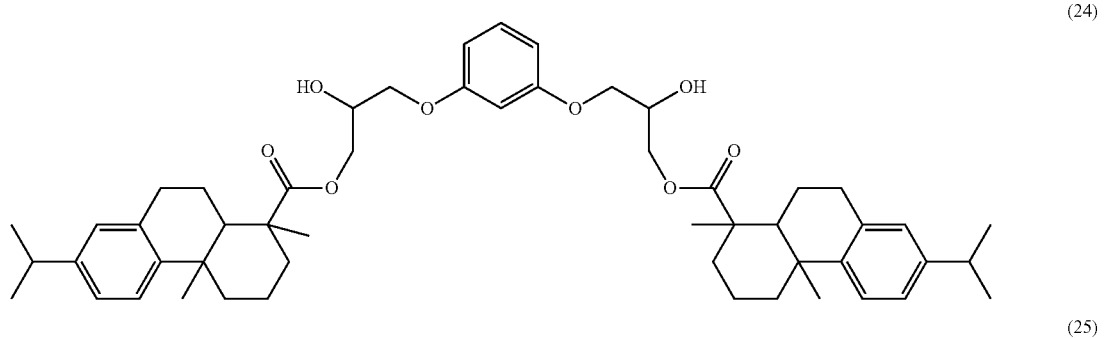
(25)
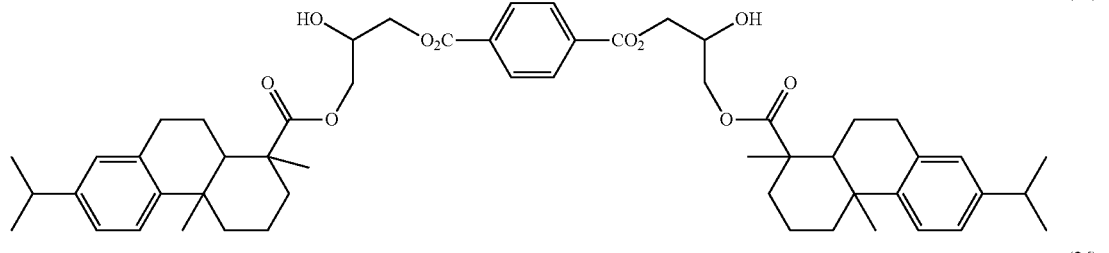
(26)
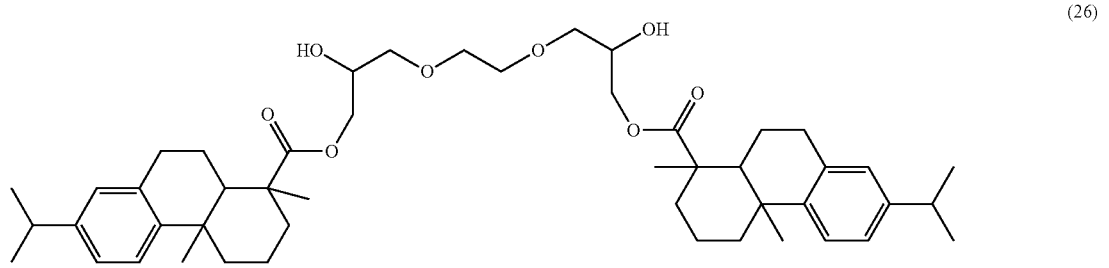
(27)

(28)
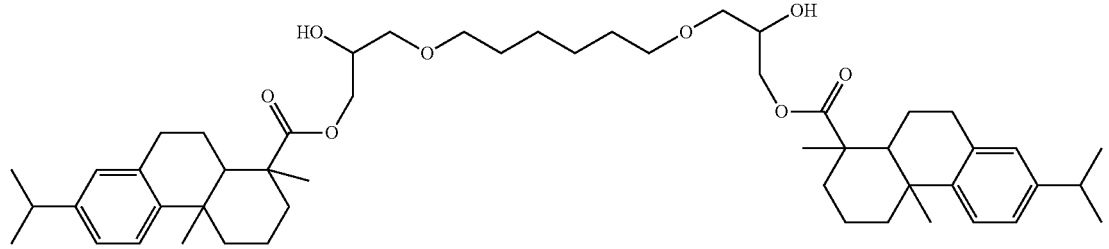
(29)
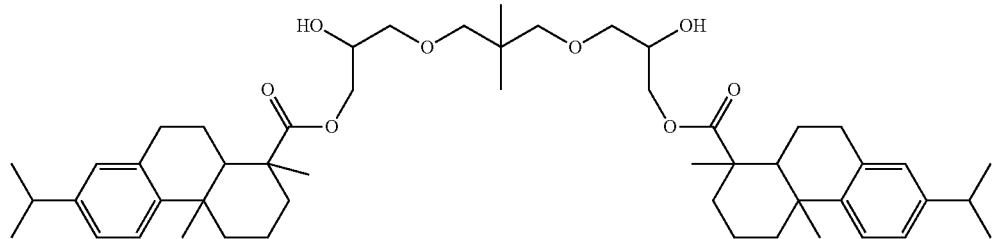
(30)
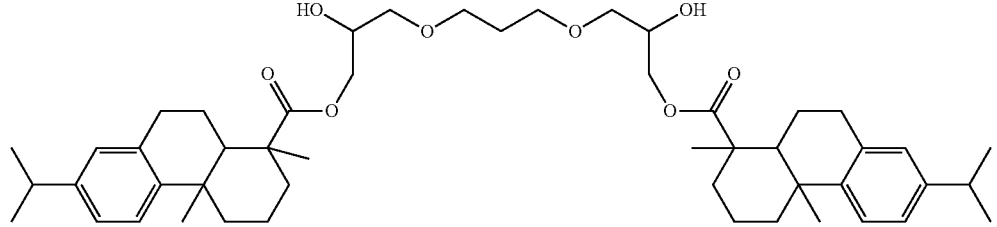
(31)
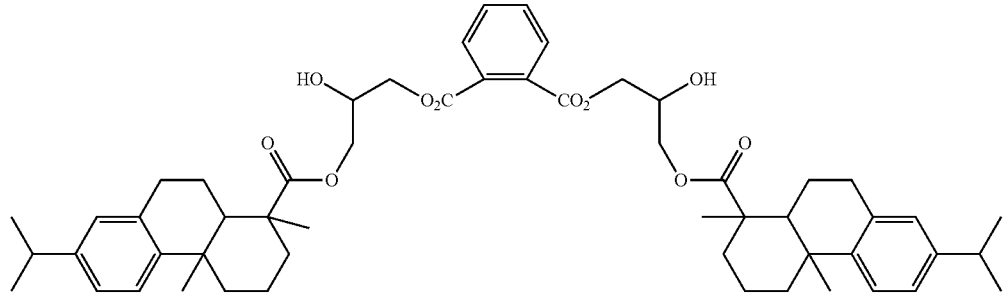
(32)
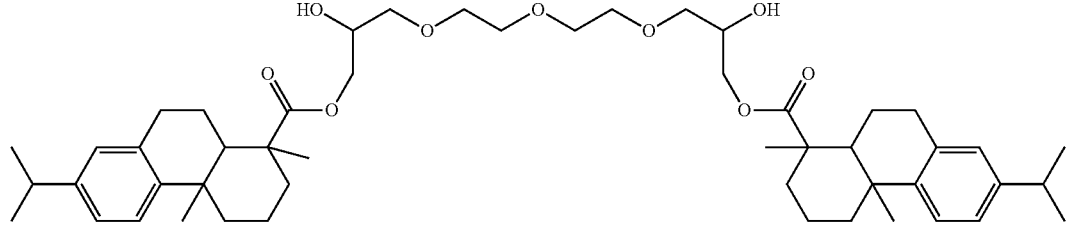
(33)
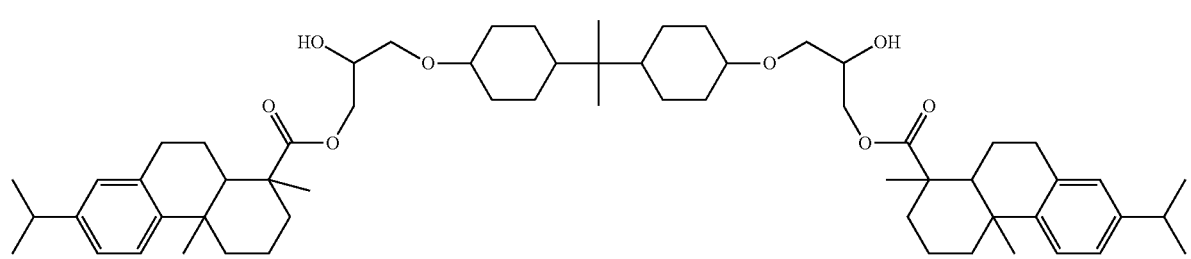

(34)
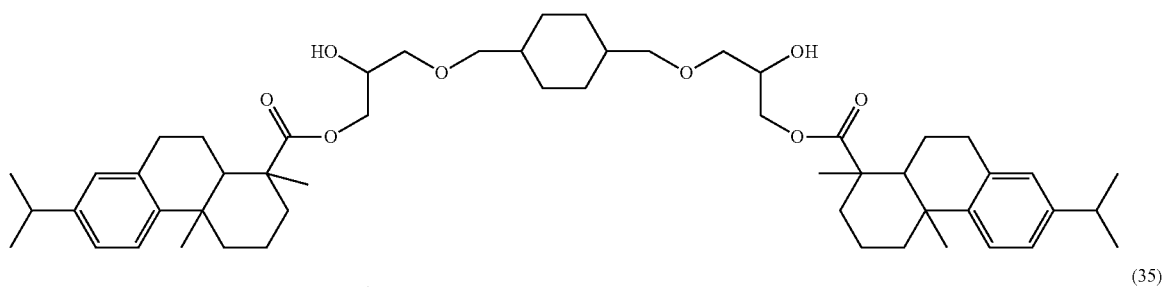
(35)
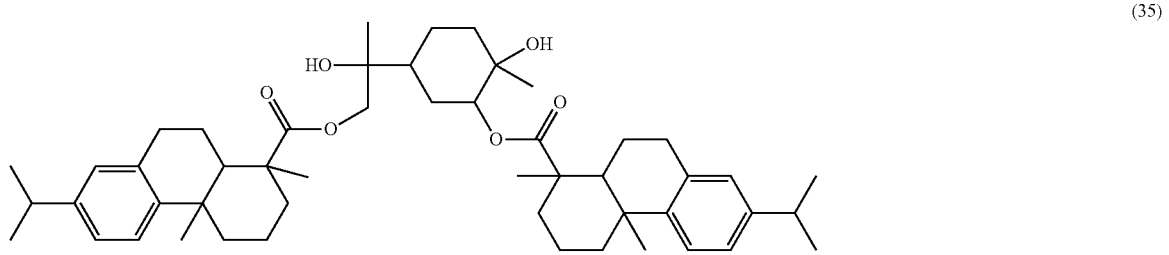
(36)
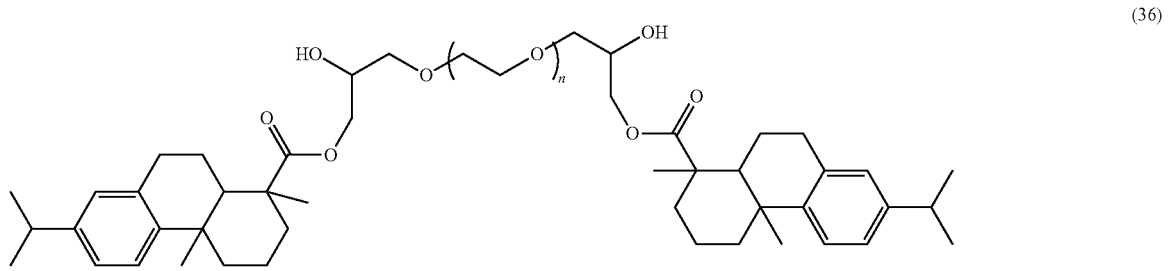
(37)
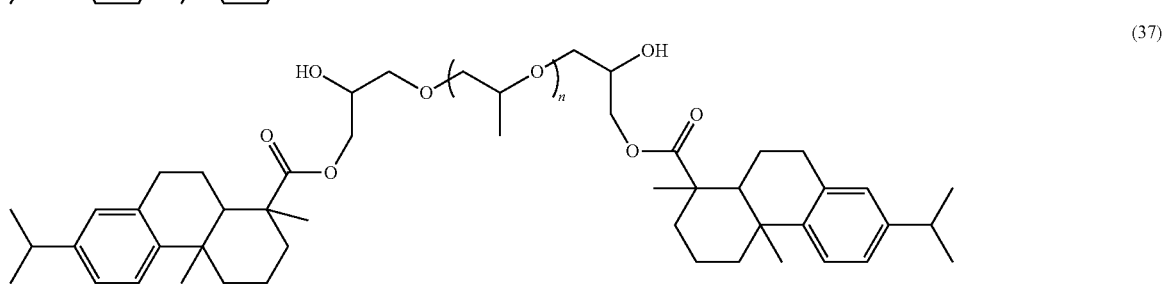
(38)
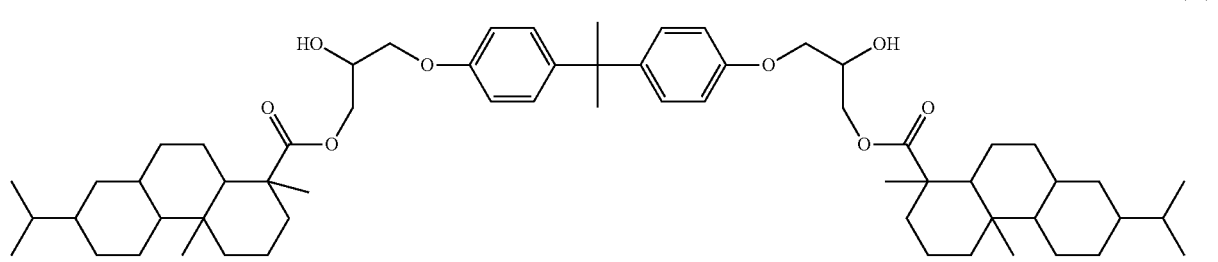
(39)
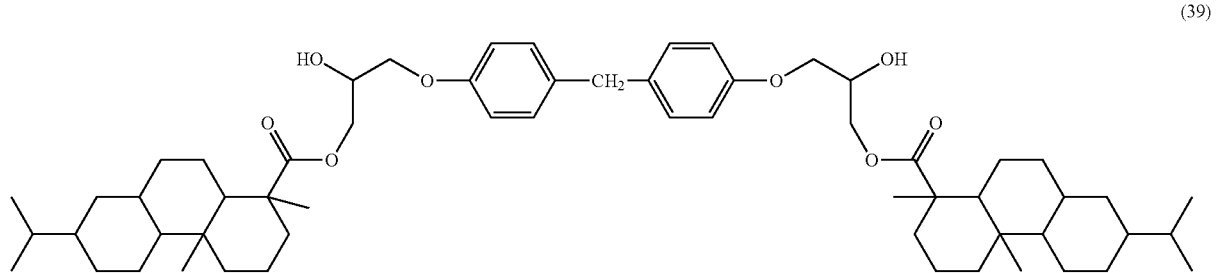

-continued

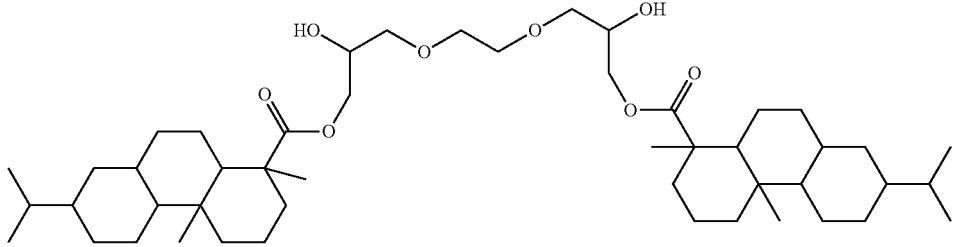
(40)

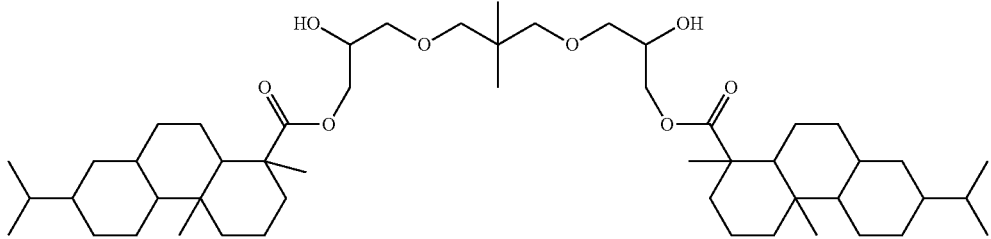
(41)

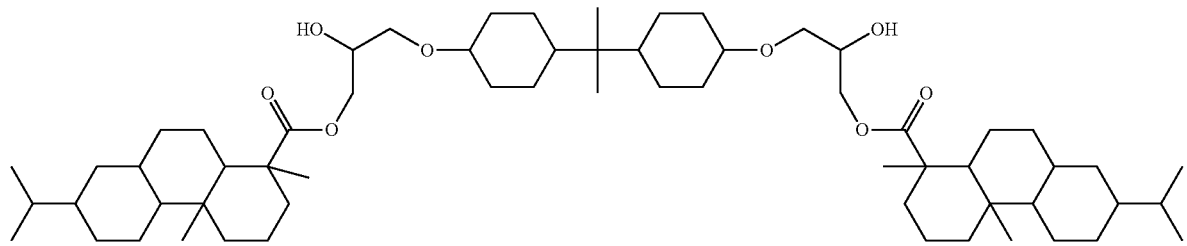
(42)

In the exemplary compounds of the specific rosin diols, each n represents an integer of 1 or greater.

In the present exemplary embodiment, the dicarboxylic acid component may be selected from the group consisting of aromatic dicarboxylic acids, aliphatic dicarboxylic acids, and mixtures thereof. Examples of such dicarboxylic acid components include: aromatic dicarboxylic acids, such as phthalic acid, isophthalic acid, terephthalic acid, 1,4-naphthalenedicarboxylic acid and 2,6-naphthalenedicarboxylic acid; aliphatic dicarboxylic acids, such as oxalic acid, malonic acid, maleic acid, fumaric acid, citraconic acid, itaconic acid, glutaconic acid, succinic acid, adipic acid, sebacic acid, azelaic acid, dimeric acids, branched $C_1$-$C_{20}$ alkyl succinic acids and branched $C_1$-$C_{20}$ alkenyl succinic acids; anhydrides of these acids; and $C_1$-$C_3$ alkyl esters of these acids. Of these, aromatic carboxylic acid compounds are preferred in terms of durability and fixability of a toner and dispersibility of a coloring agent.

In the present exemplary embodiment, a combination of the specific rosin diol and another diol component may be used as the diol component. In the present exemplary embodiment, the content of the specific rosin diol in the diol component is preferably from 10 mole % to 100 mole %, more preferably 20 mole % to 90 mole % from the viewpoint of electrostatic properties.

The alcoholic component other than the specific rosin diol can be selected from the group consisting of aliphatic diols, etherified diphenols and mixtures thereof so long as the performance of a toner is not deteriorated.

Examples of the aliphatic dials include ethylene glycol, 1,2-propanediol, 1,3-propanediol, 1,2-butanediol, 1,3-butanediol, 1,4-butanediol, 2,3-butanediol, 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 1,3-hydroxy-2,2-dimethylpropyl-3-hydroxy-2,2-dimethylpropanoate, diethylene glycol, triethylene glycol, polyethylene glycol, dipropylene glycol, and polypropylene glycol. These aliphatic diols may be used alone or in combination of two or more thereof.

In the present exemplary embodiment, an etherified diphenol may be further used, together with the aliphatic diol. The etherified diphenol is a diol obtained by addition reaction of bisphenol A and an alkylene oxide. The alkylene oxide is ethylene oxide or propylene oxide. The average number of moles of the alkylene oxide added is from 2 moles to 16 moles per mole of the bisphenol A.

The specific polyester of the present exemplary embodiment is prepared from the acid component and the alcoholic component as raw materials by methods publicly known and used in the art. Either transesterification or direct esterification can be applied. The polycondensation may also be accelerated by increasing the reaction temperature under pressure or flowing an inert gas under reduced pressure or ambient pressure. Depending on the reaction conditions, a reaction catalyst may be used to accelerate the reaction. The reaction catalyst may be any of those publicly known and used in the art. The reaction catalyst may be a compound of at least one metal selected from the group consisting of antimony, titanium, tin, zinc, aluminum and manganese. The reaction catalyst is preferably added in an amount of 0.01 parts by mass to 1.5 parts by mass, more preferably 0.05 parts by mass to 1.0 part by mass, based on 100 parts by mass of the acid component and the alcoholic component. The reaction temperature may be from 180° C. to 300° C.

The softening temperature of the specific polyester according to the present exemplary embodiment is preferably from 80° C. to 160° C., more preferably from 90° C. to 150° C. in terms of the fixability, storability and durability of a toner. The glass transition temperature of the specific polyester according to the present exemplary embodiment is preferably from 35° C. to 80° C., more preferably from 40° C. to 70° C. in terms of the fixability, storability and durability of a toner. The softening temperature and glass transition temperature may be easily adjusted by controlling the composition of the raw monomers, the kind of a polymerization initiator, the molecular weight of the specific polyester and the amount of the catalyst or selecting suitable reaction conditions.

Taking into consideration the electrostatic properties of a toner, the acid value of the specific polyester according to the present exemplary embodiment is preferably from 1 mgKOH/g to 50 mgKOH/g, more preferably from 3 mgKOH/g to 30 mgKOH/g. Taking into consideration the durability and hot offset resistance of a toner, the weight average molecular weight of the specific polyester according to the present exemplary embodiment is preferably from 4,000 to 1,000,000, more preferably from 7,000 to 300,000.

The specific polyester of the present exemplary embodiment may be modified. Examples of such modified polyesters include polyesters that are grafted or blocked with phenol, urethane or epoxy by the methods described in Japanese Patent Application Laid-Open Nos. Hei 11-133668, Hei 10-239903 and Hei 8-20636.

The specific polyester of the present exemplary embodiment can be used as a binder resin for a toner to produce a toner with excellent electrostatic properties. In the toner of the present exemplary embodiment, the specific polyester may be used in combination with another binder resin known in the art, for example, a vinyl resin, such as a styrene-acrylic resin, an epoxy resin, a polycarbonate resin or a polyurethane resin so long as the effects of the present exemplary embodiment are not impaired. In this case, the content of the specific polyester according to the present exemplary embodiment is preferably 70% by mass or more, more preferably 90% by mass, still more preferably substantially 100% by mass.

<Toner>

The toner of the present exemplary embodiment contains the specific polyester of the present exemplary embodiment, and optionally, at least one component selected from coloring agents, release agents and external additives.

The coloring agent used in the present exemplary embodiment may be a dye or a pigment. A pigment is preferred in terms of light fastness and water fastness.

The coloring agent may be a pigment known in the art. Examples of preferred coloring agents include carbon black, aniline black, Aniline Blue, Calcoil Blue, Chrome Yellow, Ultramarine Blue, DuPont Oil Red, Quinoline Yellow, Methylene Blue Chloride, Phthalocyanine Blue, Malachite Green Oxalate, Lamp Black, Rose Bengal, quinacridone, Benzidine Yellow, C.I. Pigment Red 48:1, C.I. Pigment Red 57:1, C.I. Pigment Red 122, C.I. Pigment Red 185, C.I. Pigment Red 238, C.I. Pigment Yellow 12, C.I. Pigment Yellow 17, C.I. Pigment Yellow 180, C.I. Pigment Yellow 97, C.I. Pigment Yellow 74, C.I. Pigment Blue 15:1, and C.I. Pigment Blue 15:3.

The content of the coloring agent in the toner of the present exemplary embodiment is preferably in the range of 1 part by mass to 30 parts by mass, based on 100 parts by mass of the binder resin. If needed, it is also effective to use a surface-treated coloring agent or a pigment dispersant. The color of the toner of the present exemplary embodiment can be determined by selecting the kind of the coloring agent. For example, the toner of the present exemplary embodiment may be yellow, magenta, cyan or black in color.

Examples of release agents for use in the present exemplary embodiment include: paraffin waxes, such as low molecular weight polypropylenes, low molecular weight polyethylenes; silicone resins; rosins; rice wax; and carnauba wax. The melting temperatures of these release agents are preferably between 50° C. and 100° C., more preferably between 60° C. and 95° C. The content of the release agent in the toner is preferably from 0.5% by mass to 15% by mass, more preferably from 1.0% by mass to 12% by mass. The presence of the release agent in an amount of more than 0.5% by mass particularly prevents the occurrence of peeling defects in oilless fixing. Meanwhile, the presence of the release agent in an amount of less than 15% by mass improves image quality and reliability for image formation without causing deterioration in the flowability of the toner.

A charge controlling agent may be used in the toner of the present exemplary embodiment. The charge controlling agent may be any of those known in the art, for example, azo-based metal complex compounds, metal complex compounds of salicylic acid and resin type charge controlling agents containing polar groups.

The toner of the present exemplary embodiment may contain a white inorganic powder as the external additive for purpose of achieving improved flowability. Examples of suitable inorganic powders include silica powder, alumina, titanium oxide, barium titanate, magnesium titanate, calcium titanate, strontium titanate, zinc oxide, silica, clay, mica, wollastonite, diatomite, chromium oxide, cerium oxide, bengala, antimony trioxide, magnesium oxide, zirconium oxide, barium sulfate, barium carbonate, calcium carbonate, silicon carbide and silicon nitride. Silica powder is particularly preferred. The mixing proportion of the inorganic powder in the toner is typically in the range of 0.01 parts by mass to 5 parts by mass, preferably 0.01 parts by mass to 2.0 parts by mass, based on 100 parts by mass of the toner. The inorganic powder may be used in combination with another material known in the art, for example, silica, titanium, resin particles (such as polystyrene, PMMA and melamine resin particles) or alumina. The toner of the present exemplary embodiment may further include a cleaning lubricant. The cleaning lubricant may be a metal salt of a higher fatty acid, typified by zinc stearate, or a powder of fluorinated polymer particles.

—Characteristics of Toner—

The shape factor SF1 of the toner according to the present exemplary embodiment is preferably in the range of 110 to 150, more preferably 120 to 140.

The shape factor SF1 is calculated by Equation 1:

$$SF1 = (ML^2/A) \times (\pi/4) \times 100 \qquad (1)$$

where ML represents the absolute maximum length of the toner and A represents the projection area of the toner.

SF1 is mainly quantified by analyzing a microscope image or scanning electron microscope image using an image analyzer. First, an optical microscope image of particles spread on the surface of a slide glass is inputted to a Luzex image analyzer via a video camera. The maximum lengths and projection areas of 100 of the particles are measured and substituted into Equation 1. The obtained values are averaged.

The volume average particle diameter of the toner according to the present exemplary embodiment is preferably in the range of 8 μm to 15 μm, more preferably 9 μm to 14 μm, still more preferably 10 μm to 12 p.m.

The volume average particle diameter of the toner is measured using a multisizer (manufactured by Beckman Coulter, Inc.) with an aperture diameter of 50 p.m. The measurement is conducted after a dispersion of the toner in an aqueous electrolyte solution (an isotonic aqueous solution) is further dispersed by sonication for at least 30 seconds or more.

There is no particular restriction on the production method of the toner. For example, the toner particles are produced by a dry method, such as kneading-pulverization, or a wet method, such as emulsification aggregation or suspension polymerization. These methods are well known in the art. If necessary, an external additive may be added to the toner particles.

According to a kneading-pulverization method, toner-forming materials including a binder resin are kneaded to obtain a kneaded product, followed by pulverization to produce toner particles.

More specifically, the kneading-pulverization method includes a process for kneading toner-forming materials including a binder resin and a process for pulverizing the kneaded product. If needed, the kneading-pulverization method may further one or more processes, such as a process for cooling the kneaded product after the kneading process.

Details regarding the individual processes will be provided below.

—Kneading Process—

In the kneading process, toner-forming materials including a binder resin are kneaded.

In the kneading process, it is preferred to add an aqueous medium (for example, distilled water, ion exchanged water or an alcohol) in an amount of 0.5 parts by mass to 5 parts by mass, based on 100 parts by mass of the toner-forming materials.

Kneaders, such as single screw extruders and twin screw extruders, may be used in the kneading process. As a non-limiting example, a kneader having a transfer screw section and two kneading sections will be explained with reference to the drawing.

FIG. 1 is a diagram for explaining the state of a screw in an example of a screw extruder used in a method for the production of a toner according to the present exemplary embodiment.

A screw extruder 11 includes a barrel 12 equipped with a screw (not shown), a feed port 14 through which toner-forming materials as raw materials for a toner is fed into the barrel 12, a liquid introducing port 16 through which an aqueous medium is added to the toner-forming materials in the barrel 12, and a discharge port 18 through which a kneaded product of the toner-forming materials in the barrel 12 is discharged.

The barrel 12 is divided into a transfer screw section SA, a kneading section NA, a transfer screw section SB, a kneading section NB and a transfer screw section SC, which are located in this order from a side close to the feed port 14. The transfer screw section SA transports the toner-forming materials fed through the feed port 14 to the kneading section NA. In the kneading section NA, the toner-forming materials are melt-kneaded by a first kneading process. The transfer screw section SB transports the melt-kneaded toner-forming materials from the kneading section NA to the kneading section NB. In the kneading section NB, the toner-forming material is melt-kneaded by a second kneading process to form a kneaded product. The transfer screw section SC transports the kneaded product to the discharge port 18.

Further, the barrel 12 has blocks 12A to 12J provided with different temperature controlling units (not shown). That is, the blocks 12A to 12J may be controlled to different temperatures. FIG. 1 shows the temperatures of the blocks. Specifically, the blocks 12A and 12B are controlled to a temperature of t0° C., the blocks 12C to 12E are controlled to a temperature of t1° C., and the blocks 12F to 12J are controlled to a temperature of t2° C. With this block configuration, the toner-forming materials in the kneading section NA are heated to t1° C. and the toner-forming materials in the kneading section NB are heated to t2° C.

The toner-forming materials including a binder resin are fed into the barrel 12 through the feed port 14 and are sent to the kneading section NA by the transfer screw section SA. The toner-forming materials are heated to the temperature (t1° C.) set in the block 12C and are converted into a molten state. The molten toner-forming materials are sent to and introduced into the kneading section NA. In the kneading section NA, the toner-forming materials are melt-kneaded at the temperature (t1° C.) set in the blocks 12D and 12E. The binder resin is melted in the kneading section NA and is sheared by the screw.

Subsequently, the toner-forming materials having undergone kneading in the kneading section NA are sent to the kneading section NB by the transfer screw section SB.

Subsequently, an aqueous medium is fed into the barrel 12 through the liquid introducing port 16 and is added to the toner-forming materials in the transfer screw section SB. FIG. 1 shows the state in which the aqueous medium is fed in the transfer screw section SB, but the feeding position of the aqueous medium is not limited thereto. For example, the aqueous medium may be fed in the kneading section NB and may be fed in both the transfer screw section SB and the kneading section NB. That is, the feeding position and site of the aqueous medium are selected according to the intended need.

As described above, the aqueous medium is fed into the barrel 12 through the liquid introducing port 16 and is mixed with the toner-forming materials in the barrel 12. The toner-forming materials are cooled down by the latent heat of vaporization of the aqueous medium and are maintained at an appropriate temperature.

Finally, the toner-forming materials are melt-kneaded in the kneading section NB to form a kneaded product and are transported to and discharged from the discharge port 18. In this way, the toner-forming materials are kneaded using the screw extruder 11 illustrated in FIG. 1 is carried out.

—Cooling Process—

In the cooling process, the kneaded product formed by the kneading process is cooled. In the cooling process, it is preferred to lower the temperature of the kneaded product to 40° C. or below at an average rate of at least 4° C./sec. By this rapid temperature drop at the average rate, the dispersed state of the kneaded product immediately after completion of the kneading process is maintained. The average cooling rate refers to an average of the cooling rates from the temperature of the kneaded product (for example, t2° C. in the case using the screw extruder 11 of FIG. 1) after completion of the kneading process to 40° C.

Specifically, the cooling process may be carried out, for example, using a roll where cooling water or brine is circulated and a press-fit type cooling belt. When this method is used for the cooling process, the cooling rate is determined depending on the speed of the roll, the flow amount of the brine, the feed amount of the kneaded product, the thickness of a slab upon rolling of the kneaded product, etc. The thickness of the slab is preferably from 1 mm to 3 mm.

—Pulverization Process—

In the pulverization process, the kneaded product cooled by the cooling process is pulverized to particles. For example, a mechanical pulverizer or jet pulverizer is used in the pulverization process.

—Classification Process—

If needed, the particles obtained by the pulverization process may be classified. By the classification process, toner particles having a volume average particle diameter in a desired range are selected, and particles having a particle diameter smaller than the lower limit of the desired range and particles having a particle diameter larger than the upper limit of the desired range are removed. For example, a traditional classifier, such as a centrifugal classifier or an inertial classifier, may be used in the classification process.

—External Addition Process—

Inorganic powders, typified by specific silica, titania and aluminum oxide powders, as already explained, may be added and attached to the obtained toner particles for the purpose of electrostatic adjustment and imparting flowability and charge exchangeability to the toner particles. This external addition process is carried out, for example, by a V-type blender, a Henschel mixer or a Roedige mixer, and the inorganic powders are attached to the toner particles in divided steps.

—Sieve Classification Process—

If necessary, a sieve classification process may be carried out after the external addition process. Specifically, the sieve classification process may be carried out, for example, using gyro shifter, a vibro classifier or a turbo classifier. By the sieve classification, coarse powders of the external additives are removed to inhibit the formation of stripes on a photoconductor, dirt in the apparatus, etc.

<Developer>

The developer of the present exemplary embodiment includes at least the toner of the present exemplary embodiment.

The toner of the present exemplary embodiment per se may be used as a single component developer. Alternatively, the toner of the present exemplary embodiment may be used as a component of a two-component developer. In this case, the toner of the present exemplary embodiment is used in combination with a carrier.

There is no particular restriction on the kind of the carrier used in the two-component developer. The carrier may be any of those known in the art. The carrier may be, for example, a magnetic metal, such as iron oxide, nickel or cobalt, a magnetic oxide, such as ferrite or magnetite, a resin-coated carrier having a resin coating layer on the surface of the magnetic metal or the magnetic oxide as a core material, or a magnetic dispersion carrier. The carrier may be a resin dispersion carrier in which a conductive material is dispersed in a matrix resin.

The mixing weight ratio of the toner to the carrier in the two-component developer is preferably in the range of about 1:100 to about 30:100, more preferably about 3:100 to about 20:100.

<Image Forming Apparatus and Image Forming Method>

Subsequently, explanation will be given concerning an image forming apparatus of the present exemplary embodiment using the developer of the present exemplary embodiment.

The image forming apparatus of the present exemplary embodiment includes a latent image holding member, a charging unit configured to electrically charge the surface of the latent image holding member, a forming unit configured to form an electrostatic latent image on the surface of the latent image holding member, a developing unit configured to develop the electrostatic latent image with the developer of the present exemplary embodiment to form a toner image, a transferring unit configured to transfer the toner image to a recording medium, and a fixing unit configured to fix the toner image on the recording medium.

The image forming apparatus of the present exemplary embodiment is used to carry out an image forming method. The image forming method includes a process for electrically charging the surface of a latent image holding member, a process for forming an electrostatic latent image on the surface of the latent image holding member, a process for developing the electrostatic latent image with the developer of the present exemplary embodiment to form a toner image, a process for transferring the toner image to a recording medium, and a process for fixing the toner image on the recording medium.

In the image forming apparatus, a part including the developing unit may be, for example, a cartridge structure (or process cartridge) that is detachably attached to a main body of the image forming apparatus. The process cartridge of the present exemplary embodiment accommodates the developer of the present exemplary embodiment, includes a developing unit configured to develop an electrostatic latent image formed on a latent image holding member with the developer to form a toner image, and is detachably attached to the image forming apparatus.

An example of the image forming apparatus according to the present exemplary embodiment will explained below, but the present exemplary embodiment is not limited thereto. Further, the main units of the image forming apparatus illustrated in the drawing will be explained, and explanation of the other units is omitted.

Figure 2:
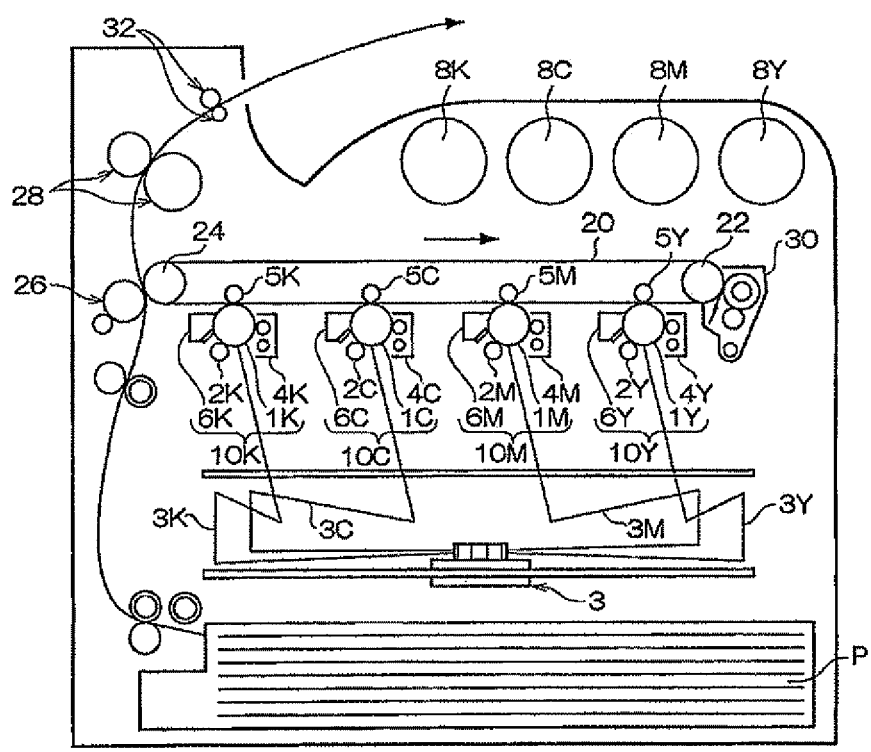
FIG. 2 is a schematic view illustrating the constitution of an example of an image forming apparatus according to the present exemplary embodiment.

FIG. 2 is a schematic view illustrating a quadruple tandem type color image forming apparatus. The image forming apparatus illustrated in FIG. 2 includes first, second, third and fourth image forming units 10Y, 10M, 10C and 10K of electrophotographic mode outputting yellow (Y), magenta (M), cyan (C) and black (K) color images based on color-separated image data. The image forming units (hereinafter, also referred to simply as "units") 10Y, 10M, 10C and 10K are arranged in parallel at predetermined intervals in a horizontal direction. The units 10Y, 10M, 10C and 10K may be process cartridges that can be detachably attached to a main body of the image forming apparatus.

As illustrated in FIG. 2, an intermediate transfer belt 20 as an intermediate transfer member is installed to run on top of the units 10Y, 10M, 10C and 10K. The intermediate transfer belt 20 is installed to wind a drive roller 22 and a support roller 24 in contact with the inner side thereof. The intermediate transfer belt 20 runs in a direction from the first unit 10Y toward the fourth unit 10K. The support roller 24 is pressed in a direction away from the drive roller 22 by a spring (now shown). A predetermined tension is given on the intermediate transfer belt 20 winding the two rollers. At a lateral surface of a latent image holding member of the intermediate transfer belt 20, an apparatus 30 for cleaning the intermediate transfer material is provided opposite the drive roller 22.

Developing apparatuses (or developing units) 4Y, 4M, 4C and 4K of the units 10Y, 10M, 10C and 10K can supply toners of four colors, i.e. yellow, magenta, cyan and black colors, accommodated in the toner cartridges 8Y, 8M, 8C and 8K, respectively.

Since the four units 10Y, 10M, 10C and 10K have the same constitution, the explanation of the first unit 10Y, which is arranged upstream the running direction of the intermediate transfer belt, can be applied to the other units. The units 10M, 10C and 10K include parts corresponding to the parts of the first unit 10Y and designated by letters M (magenta), C (cyan) and K (black) instead of Y (yellow), respectively, and their description is omitted.

The first unit 10Y has a photoconductor 1Y acting as a latent image holding member. A roller 2Y for electrically charging the surface of the photoconductor 1Y with a predetermined potential, an apparatus 3 for exposing the electrically charged surface to a laser beam 3Y based on color-separated image signals to form an electrostatic latent image, an apparatus (or a unit) 4Y for feeding an electrically charged toner to the electrostatic latent image to develop the electrostatic latent image, a primary transfer roller (or a primary transfer unit) 5Y for transferring the developed toner image to the intermediate transfer belt 20, and a cleaning apparatus (or a cleaning unit) 6Y for removing the toner remaining on the surface of the photoconductor 1Y after the primary transfer are arranged around the photoconductor 1Y.

The primary transfer roller 5Y is arranged at the inner side of the intermediate transfer belt 20 and is installed in a position opposite the photoconductor 1Y. A bias power supply (not shown) is connected and apply a primary transfer bias to each of the primary transfer rollers 5Y, 5M, 5C and 5K. The transfer bias applied to each of the primary transfer rollers from the bias power supply is varied by a control unit (not shown).

Hereinafter, an explanation will be given concerning the formation operation of a yellow image in the first unit 10Y. Prior to the operation, the surface of the photoconductor 1Y is electrically charged to about −600 V to about −800 V by the roller 2Y.

The photoconductor 1Y is formed by laminating a photosensitive layer on a conductive base having a volume resistivity of $1\times10^{-6}$ Ωcm or less at 20° C. Although the resistance of the photosensitive layer is usually high (comparable to that of general resins), the resistivity of a portion of the photosensitive layer irradiated with the laser beam 3Y tends to vary. Depending on yellow image data sent from a control unit (not shown), the exposure apparatus 3 outputs the laser beam 3Y to the surface of the electrically charged photoconductor 1Y. The laser beam 3Y is irradiated onto the surface of the photoconductor 1Y to form an electrostatic latent image in a yellow factor pattern on the surface of the photoconductor 1Y.

The electrostatic latent image refers to an image formed on the surface of the photoconductor 1Y by electrostatic charging. The electrostatic latent image is formed in the form of a so-called negative latent image because electrical charges flow on the surface of irradiated portions of the photoconductor 1Y due to the decreased resistivity of the irradiated portions but electrical charges remain on portions non-irradiated with the laser beam 3Y.

The electrostatic latent image formed on the photoconductor 1Y is rotated up to a predetermined development position according to the running motion of the photoconductor 1Y. At the development position, the electrostatic latent image on the photoconductor 1Y is visualized (developed) by the developing apparatus 4Y.

The yellow developer accommodated in the developing apparatus 4Y is friction-charged while agitating inside the developing apparatus 4Y, possesses the same polarity (negative polarity) as the counter charges charged on the photoconductor 1Y, and is maintained on a developer roll (or a developer holding member). When the surface of the photoconductor 1Y passes through the developing apparatus 4Y, the yellow toner is electrostatically attached to the antistatic latent image portions on the surface of the photoconductor 1Y. As a result, the latent image is developed with the yellow toner. The photoconductor 1Y, on which the yellow toner image is formed, runs continuously at a predetermined speed to allow the toner image developed on the photoconductor 1Y to be conveyed to a predetermined primary transfer position.

When the yellow toner image on the photoconductor 1Y is conveyed to the primary transfer position, a predetermined primary transfer bias is applied to the primary transfer roller 5Y to allow an electrostatic force directing toward the primary transfer roller 5Y from the photoconductor 1Y to act on the toner image. As a result, the toner image on the photoconductor 1Y is transferred to the intermediate transfer belt 20. The applied transfer bias has a polarity (+) opposite to the polarity (−) of the toner. In the first unit 10Y, for example, the applied transfer bias is controlled to about +10 μA by a control unit (not shown).

The toner remaining on the photoconductor 1Y is removed by the cleaning apparatus 6Y and is then collected.

The primary transfer biases applied to the primary transfer rollers 5M, 5C, 5K are controlled in substantially the same manner as in the first unit.

The intermediate transfer belt 20, to which the yellow toner image is transferred, is sequentially conveyed from the first unit 10Y to the second, third and fourth units 10M, 10C and 10K. As a result of this sequential conveying, toner images of different colors overlap to form one overlapping toner image.

The intermediate transfer belt 20, where the four toner images overlap while passing through the first, second, third and fourth units, reaches a secondary transfer unit including the intermediate transfer belt 20, the support roller 24 in contact with the inner side of the intermediate transfer belt 20 and a secondary transfer roller (or a secondary transfer unit) 26 arranged on an image holding surface of the intermediate transfer belt 20. A recording paper (or a transfer-receiving material) is fed at a predetermined timing into a gap between the secondary transfer roller 26 and the intermediate transfer belt 20, which are in contact with each other under pressure, through a feed mechanism and a predetermined secondary transfer bias is applied to the support roller 24. The applied transfer bias has the same polarity (−) as the polarity (−) of the toner and an electrostatic force directing toward the recording medium P from the intermediate transfer belt 20 acts on the overlapping toner image to allow the overlapping toner image on the intermediate transfer belt 20 to be transferred to the recording paper P. The secondary transfer bias is determined depending on the resistance of the secondary transferring unit, which is detected by a detecting unit (not shown), and the voltage thereof is controlled.

Thereafter, the recording paper P is sent to a fixing apparatus (or a fixing unit) 28. In the fixing apparatus, the overlapping toner image is heat-melted and fixed on the recording paper P. After the fixing of the color image is finished, the recording paper P is conveyed to the discharging unit by a convey roll (or a discharge roll) 32, completing the series of color image forming operations.

The image forming apparatus is constructed such that the overlapping toner image is transferred to the recording paper P through the intermediate transfer belt 20, but is not limited to this construction. For example, the image forming apparatus may have a construction that allows for direct transfer of the toner image from the photoconductor to the recording paper.

<Process Cartridge and Toner Cartridge>

Figure 3:
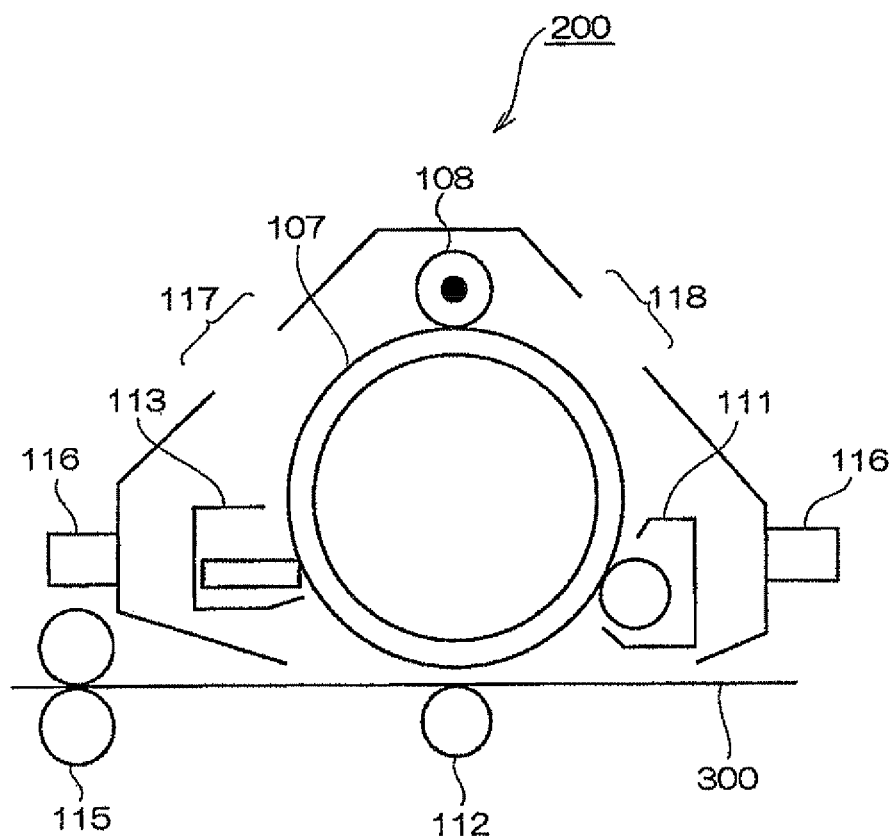
FIG. 3 is a schematic view illustrating the constitution of an example of a process cartridge according to the present exemplary embodiment.

FIG. 3 is a schematic view illustrating the constitution of a suitable example of a process cartridge accommodating the developer of the present exemplary embodiment. As illustrated in FIG. 3, the process cartridge 200 is a combination of a photoconductor 107, an electrically charging roller 108, a developing apparatus 111, a photoconductor cleaning apparatus (or a cleaning unit) 113, an opening for exposure 118 and an opening for antistatic exposure 117 on a rail 116, which are integrated into one cartridge.

The process cartridge 200 is freely attached detachably to a transfer apparatus 112, a fixing apparatus 115 and a main body of an image forming apparatus including other elements (not shown). The process cartridge 200 is combined with the main body to construct an image forming apparatus. Reference numeral 300 indicates a recording paper.

The photoconductor 107, the electrically charging roller 108, the developing apparatus 111, the cleaning unit 113, the opening for exposure 118 and the opening for antistatic exposure 117 included in the process cartridge 200 illustrated in FIG. 3 may be selectively combined. For example, the process cartridge of the present exemplary embodiment may include the developing apparatus 111 and at least one element selected from the group consisting of the photoconductor 107, the electrically charging roller 108, the developing apparatus 111, the cleaning apparatus (cleaning unit) 113, the opening for exposure 118 and the opening for antistatic exposure 117.

Next, an explanation will be given concerning a toner cartridge.

The toner cartridge is attached detachably to the image forming apparatus and at least accommodates a toner that is fed into the developing unit installed in the image forming apparatus. The toner is the toner of the present exemplary embodiment explained already. The construction of the toner cartridge is not limited so long as the toner is accommodated in the toner cartridge. A developer may be accommodated in the toner cartridge depending on the mechanism of the image forming apparatus.

The image forming apparatus illustrated in FIG. 2 is constructed such that the toner cartridges 8Y, 8M, 8C and 8K are attached detachably. The developing apparatuses 4Y, 4M, 4C and 4K are connected to corresponding toner cartridges through developer feed paths (not shown) depending on the colors thereof. The toner cartridges can be exchanged with new ones when the developers accommodated in the toner cartridges are substantially used up.

The present exemplary embodiments will be explained in detail with reference to the following examples but are not limited thereto. In the examples, unless otherwise indicated, all parts and percentages are by mass.

Method for Measurement of Various Physical Properties
<Measurement of Softening Temperature Measurement>

A sample (1 cm$^3$) is melt and is allowed to flow out using a flow tester (CFT-500, manufactured by Shimadzu Corporation) under the following conditions: dice pore diameter=0.5 mm, pressure load=0.98 MPa (10 Kg/cm$^2$), heating rate=1° C./min. A temperature corresponding to a half of the height between the starting temperature and the end temperature of the outflow is defined as the softening temperature.

<Measurement of Glass Transition Temperature>

The glass transition temperature is measured using DSC-20 (manufactured by SEICO Electronics industrial Co., Ltd.) while heating 10 mg of a sample at a constant rate of 10° C./min.

<Measurement of Weight Average Molecular Weight Mw and Number Average Molecular Weight Mn>

The weight average molecular weight Mw and number average molecular weight Mn are measured using two lines of HLC-8120GPC and SC-8020 (manufactured by TOSOH Corporation, 6.0 mm ID×15 cm) using tetrahydrofuran (THF) as the eluting solvent and an RI detector under the following conditions: sample concentration=0.5%, flow rate=0.6 ml/min, sample injection amount=10 temperature=40° C. Standard calibration curves are plotted using 10 polystyrene standard (TSK standard) samples A-500, F-1, F-10, F-80, F-380, A-2500, F-4, F-40, F-128 and F-700 (TOSOH Corporation).

<Measurement of Acid Value>

The acid value is measured by neutralization titration in accordance with JIS K0070. Specifically, 100 ml of a mixed solvent of diethyl ether and ethanol and drops of phenolphthalein as an indicator are added to an appropriate amount of a sample and the resulting mixture is sufficiently stirred in a water bath until the sample is completely dissolved. The solution is titrated with a 0.1 mol/l ethanolic solution of potassium hydroxide. The time when pale red of the indicator is observed for 30 sec is defined as the endpoint. The acid value A is calculated by A=(B×f×5.611)/S where S is the sample amount (g), B is the volume (ml) of the 0.1 mol/l ethanolic solution of potassium hydroxide, and f is the factor of the 0.1 mol/l ethanolic solution of potassium hydroxide.

Synthesis Example 1

—Synthesis of Specific Rosin Diol 1—

113 parts of bisphenol A diglycidyl ether (trade name of jER828, Mitsubishi Chemical Corporation) as a difunctional epoxy compound, 200 parts of gum rosin as a rosin component, which is a product purified by distillation at 6.6 kPa and 220° C., and 0.4 parts of tetraethylammonium bromide (Tokyo Chemical Industry Co., Ltd.) as a reaction catalyst are heated in a stainless steel reaction vessel equipped with a stirrer, a heater, a condenser and a thermometer at 130° C. for 4 hr. As a result of the reaction, the epoxy groups of the epoxy compound are ring-opened by the acid group of the rosin. When the acid value reaches 0.5 mgKOH/g, the reaction is stopped, yielding specific rosin diol 1 as the compound exemplified above.

—Synthesis of Specific Polyester Resin 1—

300 parts of specific rosin diol 1 as an alcoholic component, 53 parts of terephthalic acid (Wako Pure Chemical Industries, Ltd.) as an acid component and 0.3 parts of tetra-n-butyl titanate (Tokyo Chemical Industry Co., Ltd.) as a reaction catalyst are heated with stirring in a stainless steel reaction vessel equipped with a stirrer, a heater, a thermometer, a classifier and a nitrogen introducing tube under a nitrogen atmosphere at 230° C. for 7 hr. As a result of the reaction, specific rosin diol 1 is polycondensed with the terephthalic acid. When the molecular weight and acid value of the reaction product reach predetermined values, the reaction is stopped, yielding specific polyester resin 1.2 g of specific polyester resin 1 is heated in 10 ml of deuterated dimethyl sulfoxide and 2 ml of a 7 N deuterated methanolic solution of sodium hydroxide at 150° C. for 3 hr. After completion of the hydrolysis, deuterated water is added. The resin has the set values of specific rosin diol 1 and terephthalic acid, as confirmed by $^1$H-NMR spectroscopy.

Synthesis Example 2

—Synthesis of Specific rosin diol 30—

58 parts of ethylene glycol diglycidyl ether (trade name of EX-810, Nagase ChemteX Corporation) as a difunctional epoxy compound, 200 parts of a disproportionated rosin (trade name of Pine Crystal KR614, Arakawa Chemical Industries, Ltd.) as a rosin component and 0.4 parts of tetraethylammonium bromide (Tokyo Chemical Industry Co., Ltd.) as a reaction catalyst are heated in a stainless steel reaction vessel equipped with a stirrer, a heater, a condenser and a thermometer at 130° C. for 4 hr. As a result of the reaction, the epoxy groups of the epoxy compound are ring-opened by the acid group of the rosin. When the acid value reaches 0.5 mgKOH/g, the reaction is stopped, yielding specific rosin dial 30 as the compound exemplified above.

—Synthesis of Specific Polyester Resin 2—

250 parts of specific rosin diol 30 as an alcoholic component, 42 parts of terephthalic acid (Wako Pure Chemical Industries, Ltd.), 17 parts of dodecenylsuccinic anhydride (Tokyo Chemical Industry Co., Ltd.) and 0.3 parts of tetra-n-butyl titanate (Tokyo Chemical Industry Co., Ltd.) as a reaction catalyst are heated with stirring in a stainless steel reaction vessel equipped with a stirrer, a heater, a thermometer, a classifier and a nitrogen introducing tube under a nitrogen atmosphere at 230° C. for 7 hr. As a result of the reaction, specific rosin diol 30 is polycondensed with the terephthalic acid. When the molecular weight and acid value of the reaction product reach predetermined values, the reaction is stopped, yielding specific polyester resin 2.2 g of specific polyester resin 2 is heated in 10 ml of deuterated dimethyl sulfoxide and 2 ml of a 7 N deuterated methanolic solution of sodium hydroxide at 150° C. for 3 hr. After completion of the hydrolysis, deuterated water is added. The resin has the set values of specific rosin dial 30, terephthalic acid and dodecenylsuccinic anhydride, as confirmed by $^1$H-NMR spectroscopy.

Synthesis Examples 3-21

Specific polyester resins 3-21 are synthesized in the same manner as in Synthesis Example 1 for the synthesis of specific polyester resin 1, except that the kinds of monomers are changed as shown in Tables 2 and 3. The molecular weights, acid values, glass transition temperatures and softening temperatures of specific polyester resins 3-21 are measured. The results are shown in Tables 2 and 3.

Example 1

—Production of Toner Particles 1—

A mixture having the following composition is kneaded using an extruder and pulverized using a surface pulverization type pulverizer. Thereafter, the particles are classified into fine and coarse particles using a turbo classifier (TC-15N, Nisshin Engineering Inc.). Middle-sized particles are obtained. This classification procedure is repeated three times to obtain magenta toner particles 1 having a volume average particle diameter of 8 μm.

| (Mixture composition) | |
| --- | --- |
| Specific polyester 1 | 100 parts |
| Magenta pigment (C.I. Pigment Red 57) | 3 parts |

—Production of Toner 1—

0.5 parts of silica (R812, Nippon Aerosil Co., Ltd.) is added to 100 parts of toner particles 1, and mixed using a high-speed mixer to obtain toner 1.

—Production of Developer 1—

7 parts of toner 1 is mixed with 100 parts of a carrier composed of ferrite (particle diameter=50 μm) covered with a methyl methacrylate-styrene copolymer using a tumbler shaker mixer to obtain developer 1. Mixing of toner 1 and the carrier is performed under summer environmental conditions (30° C., relative humidity 85%) and winter environmental conditions (5° C., relative humidity 10%).

—Evaluation—

The amount of electric charge of developer 1 is measured using a blow off tester (Toshiba). As a result, the amount of electric charge of developer 1 is −35.0 μC/g under summer environmental conditions and is −55.7 μC/g under winter environmental conditions, whose ratio is 0.63. The ratio approximating 1 implies that there is no substantial difference in the amount of electric charge of developer 1 between under summer environmental conditions and under winter environmental conditions, which provides preferable results.

Copy testing is conducted on developer 1 using an electrophotographic copier (trade name of A-color, Fuji Xerox Co., Ltd.). It is confirmed that good images are obtained even after copying 3,000 sheets of paper.

Examples 2-4

Toner particles 2-4, toners 2-4 and developers 2-4 are obtained in the same manner as in Example 1, except that specific polyester 1 and the magenta pigment (C.I. Pigment Red 57) are changed to specific polyesters and pigments indicated in Table 1. Subsequently, the amounts of electric charge of developers 2-4 are measured in the same method as described in Example 1. The results are shown in Table 4. Copy tests are conducted on developers 2-4 in the same method as described in Example 1. It is confirmed that good images are obtained.

TABLE 1

| | Kind of specific polyester | Pigment |
| --- | --- | --- |
| Example 2 | 2 | Carbon black (Mogal L; Cabot) |
| Example 3 | 3 | Cyan pigment β type phthalocyanine: C.I. Pigment Blue15:3 mixture) |
| Example 4 | 4 | Disazo Yellow; C.I. Pigment Yellow12 |

Examples 5-21

Toner particles 5-21, toners 5-21 and developers 5-21 are obtained in the same manner as in Example 3, except that specific polyester 1 is changed to specific polyesters 5-21. Subsequently, the amounts of electric charge of developers 5-21 are measured in the same method as described in Example 1. The results are shown in Table 4. Copy tests are conducted on developers 5-21 in the same method as described in Example 1. It is confirmed that good images are obtained.

Comparative Example 1

—Production of Toner Particles 22—

A mixture having the following composition is pulverized and classified in the same manner as in Example 1 to obtain magenta toner particles 22 having a volume average particle diameter of 8 μm.

(Mixture Composition)
Polyester resin 1' (terephthalic acid/bisphenol A ethylene oxide adduct/cyclohexane dimethanol=83 parts/162 parts/14 parts, glass transition temperature 62° C., Mw=12,000, Mn=3,500, acid value=12 mgKOH/g, softening temperature=120° C.): 73 parts
Specific rosin dial 1: 27 parts
Magenta pigment (C.I. Pigment Red 57): 3 parts —Production of Toner 22 and Developer 22—

Toner 22 and developer 22 are obtained in the same manner as in Example 1. The amount of electric charge of developer 22 is measured and the results are shown in Table 4.

Comparative Example 2

—Production of Toner Particles 23—

A mixture having the following composition is pulverized and classified in the same manner as in Example 1 to obtain magenta toner particles 22 having a volume average particle diameter of 8 μm.

(Mixture Composition)
Polyester resin 2' (produced as follows): 100 parts
Magenta pigment (C.I. Pigment Red 57): 3 parts —Production of Polyester Resin 2'—

20 parts of an adduct of 2 moles of ethylene oxide to bisphenol A and 207 parts of an adduct of 2 moles of propylene oxide to bisphenol A as alcoholic components, 50 parts of terephthalic acid and 19 parts of anhydrous trimellitic acid as carboxylic acid components, 225 parts of gum rosin, which is a product purified by distillation at 6.6 kPa and 220° C., and 0.4 parts of tetra-n-butyl titanate as a reaction catalyst are heated with stirring in a stainless steel reaction vessel equipped with a stirrer, a heater, a condenser and a thermometer under a nitrogen atmosphere at 230° C. for 7 hr. This polycondensation yields polyester resin 2' (glass transition temperature=52° C., Mw=9,000, Mn=2,800, acid value=25 mgKOH/g, softening temperature=109° C.).

—Production of Toner 23 and Developer 23—

Toner 23 and developer 23 are obtained in the same manner as in Example 1. The amount of electric charge of developer 23 is measured and the results are shown in Table 4.

TABLE 2

| | | Synthesis Example 1 | Synthesis Example 2 | Synthesis Example 3 | Synthesis Example 4 | Synthesis Example 5 | Synthesis Example 6 | Synthesis Example 7 | Synthesis Example 8 | Synthesis Example 9 | Synthesis Example 10 |
|---|---|---|---|---|---|---|---|---|---|---|---|
| Specific polyester | | 1 | 2 | 3 | 4 | 5 | 6 | 7 | 8 | 9 | 10 |
| Acid components | Terephthalic acid | 53 parts | 42 parts | — | 66 parts | 66 parts | 66 parts | 75 parts | 75 parts | 75 parts | 75 parts |
| | Isophthalic acid | — | — | 75 parts | — | — | — | — | — | — | — |
| | Adipic acid | — | — | 7 parts | — | — | 14 parts | — | — | — | — |
| | Dodecenyl-succinic acid | — | 17 parts | — | 27 parts | 27 parts | — | 13 parts | 13 parts | 13 parts | 13 parts |
| Alcoholic components | Specific rosin diol | (1) 300 parts | (30) 250 parts | (5) 387 parts | (6) 360 parts | (9) 312 parts | (13) 246 parts | (18) 471 parts | (18) 282 parts | (18) 235 parts | (18) 282 parts |
| | 1,3-propanediol | — | — | — | 8 parts | — | — | — | — | — | — |
| | Hexanediol | — | — | 12 parts | — | — | 24 parts | — | 24 parts | 30 parts | 24 parts |
| | Neopentyl glycol | — | — | — | — | 10 parts | — | — | — | — | — |
| Weight average molecular weight (Mw) | | 18000 | 15000 | 20000 | 21000 | 19000 | 22000 | 25000 | 25000 | 25000 | 25000 |
| Number average molecular weight (Mn) | | 4000 | 3800 | 5500 | 5600 | 4500 | 5100 | 6500 | 6500 | 6500 | 6500 |
| Acid value (mgKOH/g) | | 11.5 | 12.0 | 12.2 | 12.2 | 13.5 | 11.5 | 12.0 | 12.0 | 12.0 | 17.0 |
| Glass transition temperature (° C.) | | 65 | 60 | 57 | 60 | 56 | 55 | 63 | 55 | 52 | 55 |
| Softening temperature (° C.) | | 129 | 120 | 118 | 120 | 115 | 114 | 125 | 114 | 110 | 110 |
| Kind of rosin in specific rosin diol | | Purified rosin | Disproportionated rosin | Purified rosin | Purified rosin | Purified rosin | Purified rosin | Disproportionated rosin | Disproportionated rosin | Disproportionated rosin | Disproportionated rosin |

TABLE 3

| | | Synthesis Example 11 | Synthesis Example 12 | Synthesis Example 13 | Synthesis Example 14 | Synthesis Example 15 | Synthesis Example 16 |
|---|---|---|---|---|---|---|---|
| Specific polyester | | 11 | 12 | 13 | 14 | 15 | 16 |
| Acid components | Terephthalic acid | — | — | 75 parts | 75 parts | 83 parts | 83 parts |
| | Isophthalic acid | 75 parts | 75 parts | — | — | — | — |
| | Fumaric acid | 5 parts | — | — | 5 parts | — | — |
| | Dodecenyl-succinic acid | — | 13 parts | 13 parts | — | — | — |
| Alcoholic components | Specific rosin diol | (24) 329 parts | (26) 310 parts | (27) 276 parts | (29) 286 parts | (31) 440 parts | (32) 287 parts |
| | 1,3-propanediol | — | — | — | 11 parts | — | — |
| | 1,2-propanediol | 8 parts | — | — | — | — | — |
| | Neopentyl glycol | — | 10 parts | 16 parts | — | — | — |
| | Nonanediol | — | — | — | — | — | — |
| | BPA-EO[1] | — | — | — | — | — | 40 parts |
| | BPA-PO[2] | — | — | — | — | — | 23 parts |
| Weight average molecular weight (Mw) | | 19000 | 18000 | 18000 | 19000 | 21000 | 22000 |

TABLE 3-continued

| | | | | | | |
|---|---|---|---|---|---|---|
| Number average molecular weight (Mn) | 4500 | 4000 | 4000 | 4500 | 5100 | 5500 |
| Acid value (mgKOH/g) | 12.0 | 12.2 | 12.2 | 13.5 | 11.5 | 12.0 |
| Glass transition temperature (° C.) | 58 | 55 | 56 | 60 | 64 | 56 |
| Softening temperature (° C.) | 118 | 114 | 115 | 120 | 125 | 115 |
| Kind of rosin in specific rosin diol | Disproportionated rosin | Disproportionated rosin | Disproportionated rosin | Disproportionated rosin | Disproportionated rosin | Disproportionated rosin |

| | | | Synthesis Example 17 | Synthesis Example 18 | Synthesis Example 19 | Synthesis Example 20 | Synthesis Example 21 |
|---|---|---|---|---|---|---|---|
| Specific polyester | | | 17 | 18 | 19 | 20 | 21 |
| Acid components | Terephthalic acid | | 75 parts | 75 parts | 83 parts | 75 parts | 53 parts |
| | Isophthalic acid | | — | — | — | — | — |
| | Fumaric acid | | — | 5 parts | — | — | — |
| | Dodecenylsuccinic acid | | 13 parts | — | — | 13 parts | — |
| Alcoholic components | Specific rosin diol | | (20) 365 parts | (35) 308 parts | (40) 315 parts | (41) 290 parts | (1) 300 parts |
| | 1,3-propanediol | | — | — | — | — | — |
| | 1,2-propanediol | | 8 parts | — | — | — | — |
| | Neopentyl glycol | | — | — | 10 parts | — | — |
| | Nonanediol | | — | 16 parts | — | — | — |
| | BPA-EO[1)] | | — | — | — | 40 parts | — |
| | BPA-PO[2)] | | — | — | — | 23 parts | — |
| Weight average molecular weight (Mw) | | | 22000 | 25000 | 19000 | 18000 | 16000 |
| Number average molecular weight (Mn) | | | 5500 | 6500 | 4500 | 4000 | 3500 |
| Acid value (mgKOH/g) | | | 11.5 | 16 | 10.2 | 12.7 | 20.5 |
| Glass transition temperature (° C.) | | | 55 | 57 | 56 | 54 | 62 |
| Softening temperature (° C.) | | | 114 | 118 | 115 | 113 | 125 |
| Kind of rosin in specific rosin diol | | | Disproportionated rosin | Disproportionated rosin | Hydrogenated rosin | Hydrogenated rosin | Unpurified rosin |

TABLE 4

| | Amount of electric charge | | |
|---|---|---|---|
| | (1) Summer environmental conditions (30° C./85%) | (2) Winter environmental conditions (5° C./10%) | (1)/(2) |
| Example 1 | −35.0 μC/g | −55.7 μC/g | 0.63 |
| Example 2 | −33.5 μC/g | −54.8 μC/g | 0.61 |
| Example 3 | −33.8 μC/g | −55.2 μC/g | 0.61 |
| Example 4 | −33.2 μC/g | −53.8 μC/g | 0.62 |
| Example 5 | −32.2 μC/g | −52.6 μC/g | 0.61 |
| Example 6 | −30.8 μC/g | −51.4 μC/g | 0.60 |
| Example 7 | −35.1 μC/g | −55.4 μC/g | 0.63 |
| Example 8 | −31.0 μC/g | −50.4 μC/g | 0.62 |
| Example 9 | −30.2 μC/g | −49.6 μC/g | 0.61 |
| Example 10 | −28.1 μC/g | −47.1 μC/g | 0.60 |
| Example 11 | −32.0 μC/g | −53.0 μC/g | 0.60 |
| Example 12 | −32.4 μC/g | −54.2 μC/g | 0.60 |
| Example 13 | −30.6 μC/g | −51.6 μC/g | 0.59 |
| Example 14 | −30.7 μC/g | −51.8 μC/g | 0.59 |
| Example 15 | −33.8 μC/g | −55.2 μC/g | 0.61 |
| Example 16 | −33.2 μC/g | −53.8 μC/g | 0.62 |
| Example 17 | −30.4 μC/g | −52.0 μC/g | 0.58 |
| Example 18 | −32.0 μC/g | −53.6 μC/g | 0.60 |
| Example 19 | −31.9 μC/g | −54.0 μC/g | 0.59 |
| Example 20 | −30.3 μC/g | −51.8 μC/g | 0.58 |
| Example 21 | −28.8 μC/g | −53.8 μC/g | 0.54 |
| Comparative Example 1 | −20.9 μC/g | −45.7 μC/g | 0.46 |
| Comparative Example 2 | −19.2 μC/g | −51.2 μC/g | 0.38 |

While the present invention has been shown and described with reference to certain exemplary embodiments thereof, it will be understood by those skilled in the art that various changes modifications may be made therein without departing from the spirit and scope of the present invention as defined by the appended claims.

What is claimed is:

1. A polyester resin for a toner comprising:
    a repeating unit derived from a dicarboxylic acid component; and
    a repeating unit derived from a diol component represented by Formula (1):

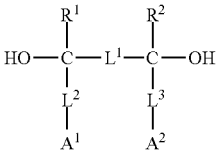

Formula (1)

wherein each of $R^1$ and $R^2$ independently represents a hydrogen atom or a methyl group,
    each of $L^1$, $L^2$ and $L^3$ independently represents a divalent linking group selected from the group consisting of carbonyl groups, ester groups, ether groups, sulfonyl groups, substituted or unsubstituted chained alkylene groups, substituted or unsubstituted cyclic alkylene groups, substituted or unsubstituted arylene groups, and combinations thereof, $L^1$ and $L^2$ or $L^1$ and $L^3$ optionally forms a ring, and each of $A^1$ and $A^2$ independently represents a rosin ester group.

2. The polyester resin according to claim 1,
wherein the dial component represented by Formula (1) is a reaction product of a difunctional epoxy compound and a rosin.

3. The polyester resin according to claim 2,
wherein the rosin is selected from the group consisting of a purified rosin, a disproportionated rosin and a hydrogenated rosin.

4. The polyester resin according to claim 1,
wherein the substituted or unsubstituted chained alkylene groups represented by $L^1$, $L^2$ and $L^3$ have a total carbon number is 1 to 10.

5. The polyester resin according to claim 1,
wherein the substituted or unsubstituted cyclic alkylene groups represented by $L^1$, $L^2$ and $L^3$ have a total carbon number is 3 to 7.

6. The polyester resin according to claim 1, having a softening temperature of 80° C. to 160° C.

7. The polyester resin according to claim 1, having an acid value of 1 mgKOH/g to 50 mgKOH/g.

8. A toner comprising the polyester resin according to claim 1.

9. The toner according to claim 8,
wherein the diol component represented by Formula (1) is a reaction product of a difunctional epoxy compound and a rosin.

10. A developer comprising the toner according to claim 8.

11. The developer according to claim 10,
wherein the diol component represented by Formula (1) is a reaction product of a difunctional epoxy compound and a rosin.

12. A toner cartridge accommodating the toner according to claim 8.

13. A process cartridge accommodating the developer according to claim 10, comprising a unit for developing an electrostatic latent image formed on a latent image holding member with the developer to form a toner image.

14. An image forming apparatus comprising:
a latent image holding member;
a charging unit configured to electrically charge the surface of the latent image holding member;
a forming unit configured to form an electrostatic latent image on a surface of the latent image holding member;
a developing unit configured to develop the electrostatic latent image with the developer according to claim 10 to form a toner image;
a transferring unit configured to transfer the toner image to a recording medium; and
a fixing unit configured to fix the toner image on the recording medium.

15. An image forming method comprising:
forming an electrostatic latent image on a surface of a latent image holding member;
developing the electrostatic latent image with the developer according to claim 10 to form a toner image;
transferring the toner image to a recording medium; and
fixing the toner image on the recording medium.

16. The image forming method according to claim 15,
the diol component represented by Formula (1) is a reaction product of a difunctional epoxy compound and a rosin.

* * * * *